United States Patent
Lee et al.

(10) Patent No.: US 10,699,676 B2
(45) Date of Patent: Jun. 30, 2020

(54) DISPLAY APPARATUS, METHOD OF CONTROLLING THE SAME, AND COMPUTER PROGRAM PRODUCT THEREOF

(71) Applicant: SAMSUNG ELECTRONICS CO., LTD., Suwon-si (KR)

(72) Inventors: Jong-in Lee, Seoul (KR); Sung-hyun Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 33 days.

(21) Appl. No.: 16/039,941

(22) Filed: Jul. 19, 2018

(65) Prior Publication Data

US 2019/0026005 A1    Jan. 24, 2019

(30) Foreign Application Priority Data

Jul. 19, 2017 (KR) ........................ 10-2017-0091309

(51) Int. Cl.
| | |
|---|---|
| *G09G 5/14* | (2006.01) |
| *G06F 3/14* | (2006.01) |
| *G06F 3/01* | (2006.01) |
| *H04N 5/232* | (2006.01) |
| *G06T 15/20* | (2011.01) |
| *G06T 19/00* | (2011.01) |

(Continued)

(52) U.S. Cl.
CPC ............. *G09G 5/14* (2013.01); *G06F 3/01* (2013.01); *G06F 3/04815* (2013.01); *G06F 3/14* (2013.01); *G06T 15/20* (2013.01); *G06T 19/00* (2013.01); *G09G 5/026* (2013.01); *H04N 5/23238* (2013.01)

(58) Field of Classification Search
None
See application file for complete search history.

(56) References Cited

U.S. PATENT DOCUMENTS

| | | |
|---|---|---|
| 6,535,232 B1 | 3/2003 | Tsuda et al. |
| 6,741,250 B1 | 5/2004 | Furlan et al. |

(Continued)

FOREIGN PATENT DOCUMENTS

JP    2005251018 A    9/2005

OTHER PUBLICATIONS

International Search Report and Written Opinion (PCT/ISA/210 and PCT/ISA/237), dated Oct. 31, 2018 by International Searching Authority in counterpart International Application No. PCT/KR2018/008137.

(Continued)

*Primary Examiner* — Frank S Chen
(74) *Attorney, Agent, or Firm* — Sughrue Mion, PLLC

(57) ABSTRACT

A display apparatus, a method of controlling the same, and a computer program product thereof are provided. The display apparatus includes a display configured to display an image; and a processor configured to determine output coordinates of a frame involved in a section, according to a plurality of sections of content including a plurality of frames reproducible for a predetermined period of time, and control the display to display a region of a frame corresponding to a viewpoint while moving the viewpoint along determined output coordinates, when determination of the output coordinates of at least one section among the plurality of sections is completed.

18 Claims, 23 Drawing Sheets

(51) Int. Cl.
*G09G 5/02* (2006.01)
*G06F 3/0481* (2013.01)

(56) References Cited

U.S. PATENT DOCUMENTS

| | | |
|---|---|---|
| 2010/0045678 A1 | 2/2010 | Reid |
| 2011/0273451 A1* | 11/2011 | Salemann ............... G06T 15/20 |
| | | 345/427 |
| 2012/0057852 A1 | 3/2012 | Devleeschouwer et al. |
| 2012/0092348 A1 | 4/2012 | McCutchen |
| 2013/0100171 A1 | 4/2013 | Ohba et al. |
| 2013/0345980 A1* | 12/2013 | van Os ............. G01C 21/3626 |
| | | 701/538 |
| 2016/0357410 A1 | 12/2016 | Frankel et al. |
| 2017/0104927 A1 | 4/2017 | Mugavero et al. |
| 2017/0255258 A1* | 9/2017 | Feiner ................ G02B 27/0093 |
| 2019/0297283 A1* | 9/2019 | Douady ............. H04N 5/23238 |

OTHER PUBLICATIONS

Communication dated Mar. 26, 2020 issued by the European Patent Office in counterpart European Application No. 18835542.4.
Ariki, Y., et al., "Automatic Production System of Soccer Sports Video by Digital Camera Work Based on Situation Recognition", Proceedings/ISM 2006, Eighth IEEE International Symposium on Multimedia (ISM'06), Dec. 11-13, 2006, San Diego, CA, IEEE Computer Society, Los Alamitos, Calif. [U.A.], Dec. 1, 2006, pp. 851-860 (8 pages), XP031041884.

* cited by examiner

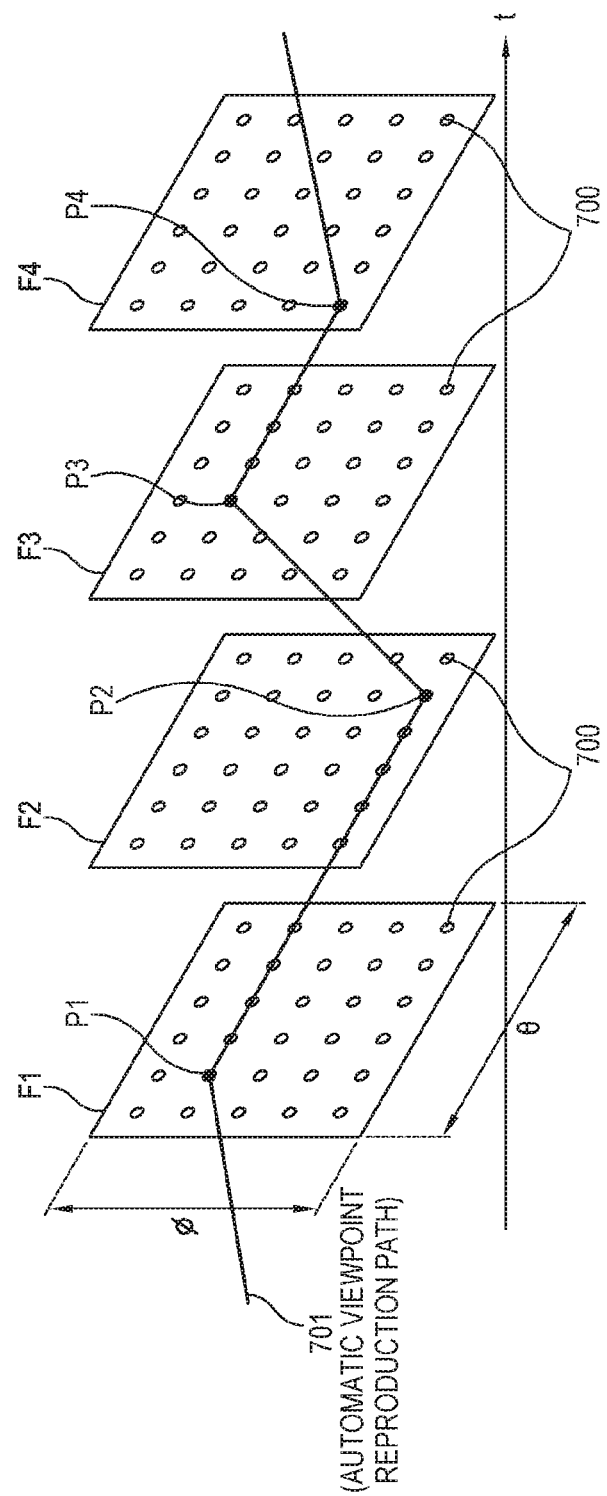

FIG. 8

$$E(Cd \cdot tn) = \underbrace{\frac{|Cd \cdot tn(\varphi,\theta) - Cd \cdot tn\text{-}1(\varphi,\theta)|}{180} \times (-K) \times M}_{801} + \underbrace{Cd \cdot tn(w) \times L}_{802}$$

WHERE, $(0 \leq K, L < 10)$

- $Cd \cdot tn$ : D-RANKING COORDINATES OF TN VIEWPOINT
- ANGLE: $Cd \cdot tn(\varphi, \theta)$,
- IMPORTANCE: $Cd \cdot tn(w)$
- K : WEIGHTED VALUE OF DISTANCE
- L : WEIGHTED VALUE OF IMPORTANCE
- M(optional) : MODE VALUE
- $E(Cd \cdot tn)$ : $Cd \cdot tn$, $Cd \cdot tn\text{-}1$ CONNECTING LINE SCORE BETWEEN

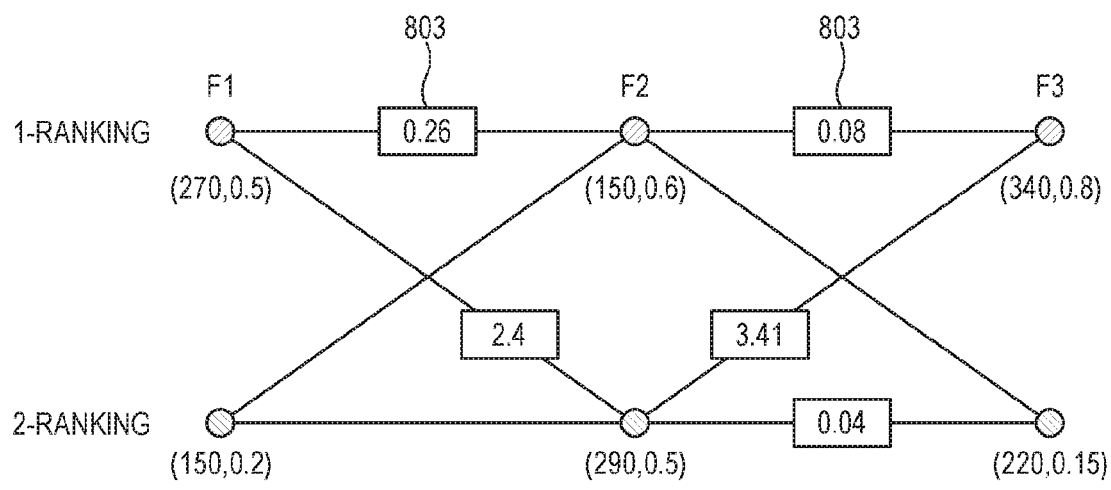

($\theta$, IMPORTANCE)

FIG. 9
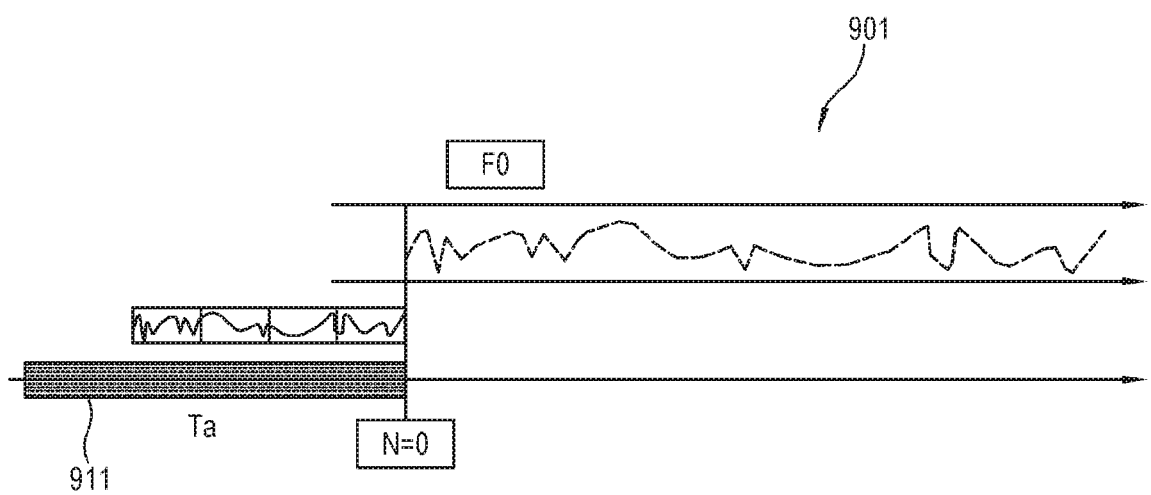
<AUTOMATIC VIEWPOINT REPRODUCTION AFTER COMPUTING ALL SECTIONS>
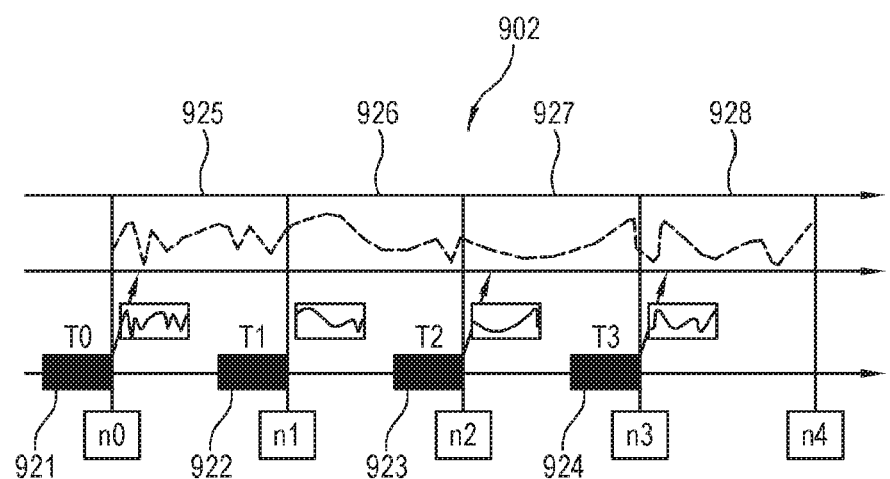
<COMPUTATIONS ACCORDING TO SECTIONS AND AUTOMATIC VIEWPOINT REPRODUCTION>

(N: THE NUMBER OF VIEWPOINT TO BE CONSIDERED IN EACH FRAME
K: THE NUMBER OF TOTAL SECTION)

DISPLAY APPARATUS, METHOD OF CONTROLLING THE SAME, AND COMPUTER PROGRAM PRODUCT THEREOF

CROSS-REFERENCE TO RELATED APPLICATION(S)

This application is based on and claims priority under 35 U.S.C. § 119 to Korean Patent Application No. 10-2017-0091309 filed on Jul. 19, 2017 in the Korean Intellectual Property Office, the disclosure of which is incorporated by reference herein in its entirety.

BACKGROUND

Field

The disclosure relates to a display apparatus and a method of controlling the same, and more particularly to a display apparatus, a method of controlling the same, and a computer program product thereof, in which a 360-degree image is automatically reproduced by calculating a moving path of a viewpoint.

Description of the Related Art

Recently, various images have been provided through a display apparatus. For example, there is a 360-degree image. To this end, many cameras or a camera with a plurality of lenses may be used to take omnidirectional images. The display apparatus maps the taken images onto a virtual space and outputs a screen so that a user can feel as if s/he is in a real space and interacts with the screen.

The display apparatus moves a viewpoint on the output screen in response to a user's input, or automatically determines a moving path of a viewpoint (hereinafter, the latter case will be referred to as 'automatic viewpoint reproduction' or 'automatic path reproduction'). In the automatic viewpoint reproduction, there are many ways of determining the moving path of the viewpoint. For example, the moving path of the viewpoint is determined based on a user's region of interest. The region of interest is determined based on matters of a user's interest. To determine the viewpoint based on the region of interest or the like specific reference, computations are required.

However, according to a related art, content has to be entirely subjected to the computations so as to be reproduced as an image. Therefore, when a large size of content is given or when a reference for determining the viewpoint is complicated, the quantity of computations increases and becomes a burden on performance, thereby causing a problem. Further, according to the related art, when the automatic viewpoint reproduction is stopped by a user's input for manually moving a viewpoint and then resumed, the computations are performed again with regard to the next paths and become a burden on operations, thereby causing a problem.

However, the viewpoint may not move as desired by a user during the automatic viewpoint reproduction. As a result, a user may feel dizzy due to unintended change in the viewpoint, thereby causing a problem.

Further, according to the related art, in the case where the automatic viewpoint reproduction is stopped by a user's input for manually moving a viewpoint and then resumed, there are no specific references for where the next paths will be. Therefore, in this case, there is a need of resuming the reproduction to be more convenient for a user.

SUMMARY

Provided are a display apparatus, a method of controlling the same, and a computer program product thereof, in which a computation burden is reduced by decreasing the quantity of computation processed for automatic viewpoint reproduction.

Further, provided is a display apparatus, which can relieve dizziness a user may feel during automatic viewpoint reproduction, and a method of controlling the same.

Further still, provided are a display apparatus, which is convenient for a user to resume automatic viewpoint reproduction after manual viewpoint reproduction, and a method of controlling the same.

Additional aspects will be set forth in part in the description which follows and, in part, will be apparent from the description, or may be learned by practice of the presented embodiments.

In accordance with an aspect of the disclosure, there is provided a display apparatus comprising: a display; and a processor configured to map a frame of a content on a three-dimensional object, identify output coordinates corresponding to a viewpoint which changes according to a user input while the content is played back, and control the display to display a region of the frame mapped on the three-dimensional object based on the identified output coordinates, wherein the processor is further configured to identify first output coordinates of frames involved in a first section of the content; playback the first section of the content based on the identified first output coordinates; after the playback of the first section of the content is started, identify second output coordinates of frames involved in a second section of the content based on at least one of the first output coordinates, the second section following the first section; and playback the second section of the content based on the identified second output coordinates.

The processor is may be configured to identify the output coordinates so that the movement of the viewpoint between the frames decreases.

The processor is may be configured to replace second output coordinates with fourth output coordinates, the fourth output coordinates being relatively closer to a straight path between first output coordinates and third output coordinates than the second output coordinates, with regard to the first output coordinates, the second output coordinates and the third output coordinates determined in sequence.

The processor may be further configured to control the viewpoint to be kept for a determined time period while the viewpoint moves according to the identified output coordinates.

The processor may be further configured to control the viewpoint to move while decreasing at least one of a moving amount, a moving speed, and a moving acceleration of the viewpoint.

The processor may be further configured to control the viewpoint to move from first output coordinates to third output coordinates by skipping over second output coordinates, with regard to the first output coordinates, the second output coordinates, and the third output coordinates determined in sequence.

The processor may be configured to interpolate fourth output coordinates into a point on an adjusted path from the first output coordinates to the third output coordinates, and control the viewpoint to move from the first output coordinates to the second output coordinates via the fourth output coordinates.

The processor may be configured to control the viewpoint to move in accordance with a change in the output coordinates when the change in the output coordinates is greater than or equal to a lower limit, control the viewpoint to not move when the change in the output coordinates is lower than the lower limit.

The display apparatus may include a user input configured to receive a user's input, wherein the processor may be further configured to, when the user's input is received while the viewpoint is moving based on the output coordinates determined by a predetermined method, control the viewpoint to move based on output coordinates determined by the received user's input.

The processor may be configured to determine output coordinates at a current viewpoint again by the predetermined method, and control movement of the viewpoint to be resumed, after moving the viewpoint based on the output coordinates determined by the user's input.

The processor may be further configured to control movement of the viewpoint to be resumed based on output coordinates previously determined by the predetermined method at a current viewpoint, after moving the viewpoint based on the output coordinates determined by the user's input.

The processor may be further configured to control movement of the viewpoint to be resumed based on output coordinates previously determined by the predetermined method by returning to the viewpoint at which the user's input is received, after moving the viewpoint based on the output coordinates determined by the user's input.

In accordance with an aspect of the disclosure, there is provided a method of controlling a display apparatus, the method including: mapping a frame of a content on a three-dimensional object; identifying output coordinates corresponding to a viewpoint which changes according to a user input while the content is played back; displaying a region of the frame mapped on the three-dimensional object based on the identified output coordinates; identifying first output coordinates of frames involved in a first section of the content; playing back the first section of the content based on the identified first output coordinates; after the playback of the first section of the content is started, identifying second output coordinates of frames involved in a second section of the content based on at least one of the first output coordinates, the second section following the first section; and playing back the second section of the content based on the identified second output coordinates.

The method may include identifying the output coordinates so that the movement of the viewpoint between the frames decreases.

The controlling of the viewpoint may include replacing second output coordinates with fourth output coordinates, the fourth output coordinates being relatively closer to a straight path between first output coordinates and third output coordinates than the second output coordinates, with regard to the first output coordinates, the second output coordinates and the third output coordinates determined in sequence.

The controlling of the viewpoint may include controlling the viewpoint to be kept for a predetermined section while the viewpoint moves.

The controlling of the viewpoint may include controlling the viewpoint to be kept for a determined time period while the viewpoint moves according to the identified output coordinates.

The controlling of the viewpoint may include controlling the viewpoint to move from first output coordinates to third output coordinates by skipping over second output coordinates, with regard to the first output coordinates, the second output coordinates, and the third output coordinates determined in sequence.

The controlling of the viewpoint may include interpolating fourth output coordinates into a point on an adjusted path from the first output coordinates to the third output coordinates, and controlling the viewpoint to move from the first output coordinates to the second output coordinates via the fourth output coordinates.

In accordance with an aspect of the disclosure, there is provided a non-transitory computer-readable recording medium having recorded thereon one or more instructions for performing operations for controlling a display apparatus, the operations comprising: mapping a frame of a content on a three-dimensional object; identifying output coordinates corresponding to a viewpoint which changes according to a user input while the content is played back; displaying a region of the frame mapped on the three-dimensional object based on the identified output coordinates; identifying first output coordinates of frames involved in a first section of the content; playing back the first section of the content based on the identified first output coordinates; after the playback of the first section of the content is started, identifying second output coordinates of frames involved in a second section of the content based on at least one of the first output coordinates, the second section following the first section; and playing back the second section of the content based on the identified second output coordinates.

BRIEF DESCRIPTION OF THE DRAWINGS

The above and other aspects, features, and advantages of the present disclosure will be more apparent from the following description taken in conjunction with the accompanying drawings, in which:

FIG. 7 illustrates an example of a path based on automatic viewpoint reproduction in a display apparatus according to an embodiment;

FIG. 8 is a method of determining a path based on automatic viewpoint reproduction in a display apparatus according to an embodiment;

FIGS. 9 and 10 illustrate effects on improving a processing efficiency of a display apparatus according to an embodiment;

DETAILED DESCRIPTION

Hereinafter, embodiments will be described in detail with reference to accompanying drawings. Descriptions about the embodiments set forth herein will be made with reference to matters depicted in the accompanying drawings, in which like numerals or symbols refer to substantially like elements throughout.

Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
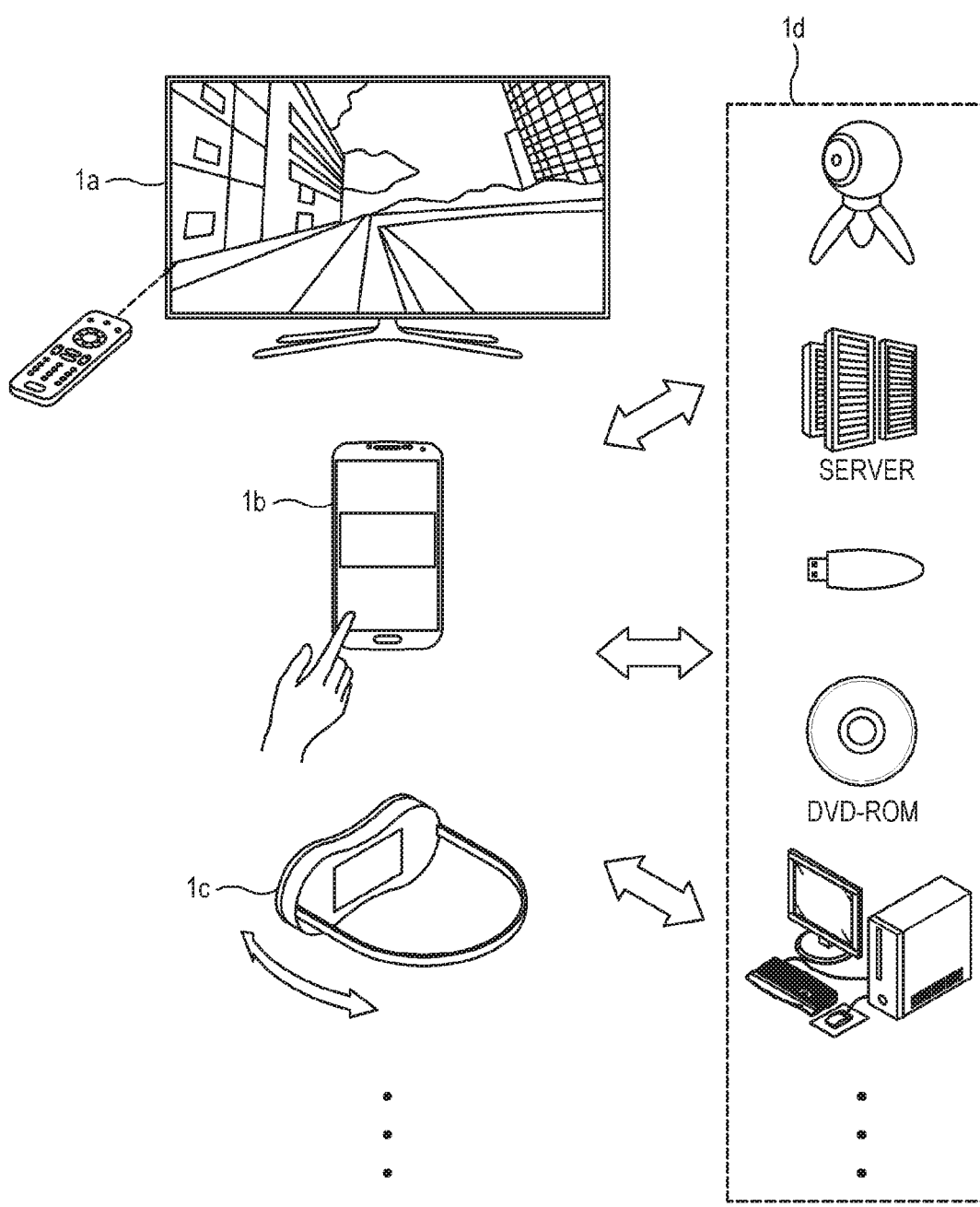
FIG. 1 illustrates display apparatuses according to an embodiment.

FIG. 1 illustrates display apparatuses according to an embodiment. The display apparatuses 1a, 1b or 1c, according to an embodiment, may be for example materialized by a TV. Further, the display apparatuses 1a, 1b or 1c, according to another embodiment, may be for example materialized by a smart phone, a tablet computer, a mobile phone, a smart watch, a wearable device such as a head-mounted display, a computer, a multimedia player, an electronic frame, a digital advertising board, a large format display, a digital signage, a set-top box, a refrigerator, and the like apparatus capable of outputting an image based on content. However, the display apparatus 1a, 1b or 1c, according to an embodiment may be materialized by any apparatus capable of outputting an image without limitations.

An image output from the display apparatus 1a, 1b or 1c according to an embodiment may for example include an image based on 360-degree virtual reality (VR) content. In this embodiment, the display apparatus 1a, 1b or 1c may directly generate the image or may receive the image from the outside. As shown in FIG. 1, the display apparatus 1a, 1b or 1c may receive an image through an external device 1d such as a camera, a server, a universal serial bus (USB) storage, a digital versatile disc (DVD) player, a computer, etc. In another embodiment, the display apparatus 1a, 1b or 1c may include at least one camera.

Figure 2:
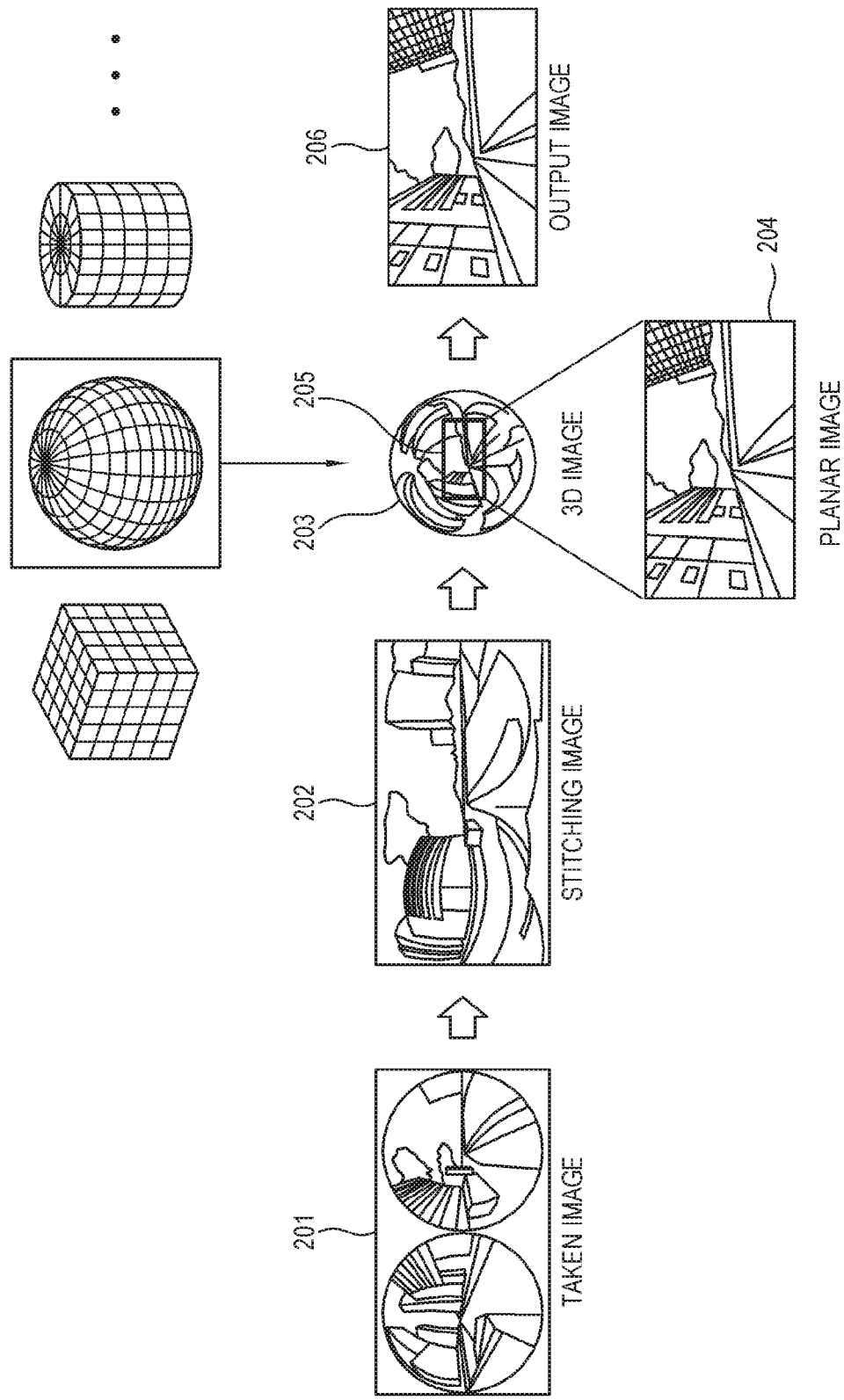
FIG. 2 illustrates a process of making a 360-degree image in a display apparatus according to an embodiment.

FIG. 2 illustrates a process of making a 360-degree image in the display apparatus 1a, 1b or 1c according to an embodiment. In this embodiment, a taken image 201 may be generated from a plurality of images acquired in different directions through a camera having at least one lens so that a viewpoint can move. As necessary, the at least one lens of the camera may be a wide-angle lens. However, there are no limits to the means for generating the taken image 201, and the taken image 201 may be generated from a plurality of cameras.

Next, the stitching image 202 according to an embodiment is converted from the taken image 201. The stitching image 202 may be for example generated by a high dynamic range imaging (HDRI) mapping method of mapping the taken image 201 onto a equirectangular or the like three-dimensional figure. According to an embodiment, there are no limits to the HDRI mapping method, and the stitching image 202 may be generated by a cube mapping method of mapping images acquired in six directions on to a cubic figure. The display apparatus 1a, 1b or 1c according to an embodiment may generate the stitching image 202 with the taken images 201 received from the outside, or may receive the stitching image 202 from the outside.

According to an embodiment, the display apparatus 1a, 1b or 1c coverts the stitching image 202 into a three-dimensional (3D) image 203. According to an embodiment, the 3D image 203 may be for example shaped like a sphere, a rectangular parallelepiped, a cylinder, etc.

Next, the display apparatus 1a, 1b or 1c generates a planar image 204 by applying curve-plane mapping to an output region 205, which will be displayed on a screen, of the 3D image 203. According to an embodiment, the output region 205 may be selected by a user. Specifically, the display apparatus 1a, 1b or 1c may change, enlarge or zoom in or out the output region 205 in response to a user's input for changing a viewpoint on the screen while displaying the output region 205. Alternatively, the display apparatus 1a, 1b or 1c may receive the 3D image 203 from the outside. Next, the display apparatus 1a, 1b or 1c displays an output image 206 based on the planar image 204 on the screen.

Figure 3:
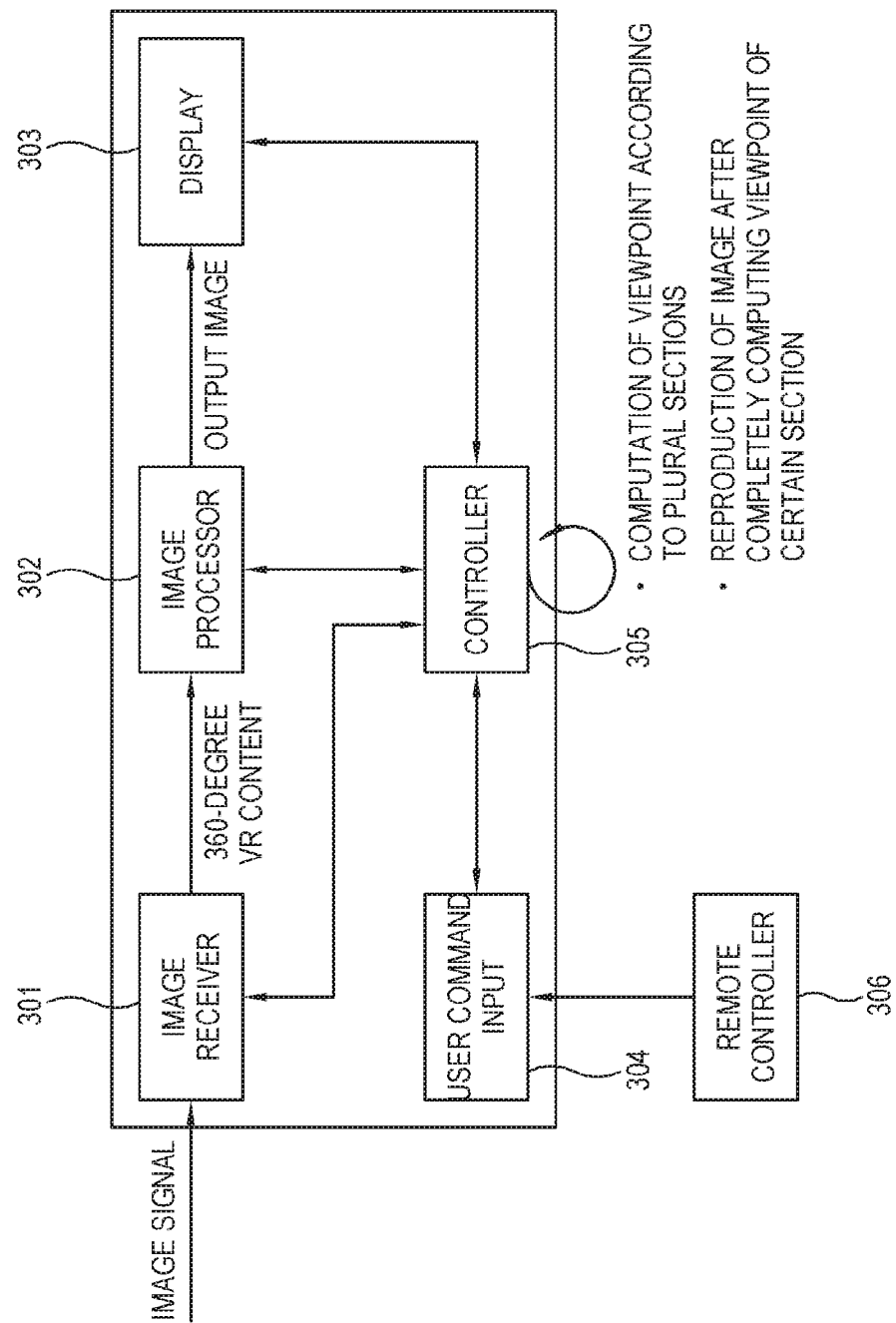
FIG. 3 is a block diagram of a display apparatus according to an embodiment.

Below, FIG. 3 is a block diagram of a display apparatus 1a, 1b or 1c according to an embodiment. The display apparatus 1a, 1b or 1c according to an embodiment includes an image receiver 301, an image processor 302, a display 303, a user command input 304 and a controller 305. However, the elements of the display apparatus 1a, 1b or 1c according to an embodiment shown in FIG. 3 are merely given by way of an example. The display apparatus according to an embodiment may be configured with other elements than those shown in FIG. 3. That is, the display apparatus according to an embodiment may include another element in addition to or may exclude any one of the elements from those shown in FIG. 3.

The image receiver 301 may receive an image signal, for example, based on 360-degree VR content. The image receiver 301 may include a tuner for receiving an image signal such as a broadcast signal. The tuner may be tuned to one channel selected by a user among a plurality of channels and receives a broadcast signal through the selected channel. Further, the image receiver 301 may receive an image signal from a camera, a server, a USB storage, a DVD player, a computer or the like external device 1d.

The image receiver 301 may include a communicator for communicating with the external device 1d and receiving an image signal. The communicator may be achieved in various types according to the external devices. For example, the communicator includes a connection part for wired communication. The connection part may receive and transmit a signal/data according to standards such as high definition multimedia interface (HDMI), HDMI-consumer Electronics Control (CFC), USB, Component, etc., and include at least one connector or terminal corresponding to each of these standards. The communicator may perform wired communication with a plurality of servers through a wired local area network (LAN).

The communicator may be achieved various other communication methods besides the connection part including the connector or terminal for the wired connection. For example, the communicator may include a radio frequency (RF) circuit configured to transmit/receive an RF signal for wireless communication with the external device, and perform one or more communications among Wi-Fi, Bluetooth, ZigBee, ultra-wide band (UWB), wireless USB, and near field communication (NFC).

The image processor 302 performs image processing with regard to an image signal received through the image receiver 301 under control of the controller 305, and outputs the image signal subjected to the image processing to the display 303 so that the display 303 can display the output image 206 (see FIG. 2).

The image processor 302 may perform image processing for converting the taken image 201 into the stitching image 202, converting the stitching image 202 into the 3D image 203, or acquiring the planar image 204 from the 3D image 203 under control of the controller 305. Besides the image processing described above, the image processor 302 may further perform at least one image processing such as scaling, etc. The image processor 302 may be materialized by one or more hardware and/or software modules or combination thereof for performing the foregoing image processing.

The display 303 displays the output image 206 (see FIG. 2) obtained by the image processing performed in the image processor 302. The display 303 may be materialized by various display types, for example, liquid crystal, plasma, a light emitting diode (LED), an organic light emitting diode (OLED), a surface conduction electron emitter, a carbon nano-tube (CNT), nano-crystal, etc. without limitations.

When the display 303 is of a liquid crystal type, the display 303 includes a liquid crystal display (LCD) panel, a backlight unit for emitting light to the LCD panel, a panel driver for driving the LCD panel, etc. Alternatively, the display 303 may be materialized by a self-emissive OLED panel without using the backlight unit.

The user command input 304 receives a user's input and transmits it to the controller 305. The user command input 304 may be variously materialized in accordance with a user's input types. For example, the user command input 304 may be materialized by a menu button installed at an outer side of the display apparatus 1a, 1b or 1c; a remote controller signal receiver for receiving a remote controller signal corresponding to a user's input received in a remote controller 306; a touch screen provided on the display 303 and receiving a user's touch input; a camera for sensing a user's gesture input; a microphone for recognizing a user's voice input; etc. The user command input 304 may receive a user's input for changing the viewpoint on the screen while the output region 205 is being displayed.

The controller 305 performs control for operating general elements of the display apparatus 1a, 1b or 1c. The controller 305 may include a control program (or instruction) for performing such a control operation, a nonvolatile memory in which the control program is installed, a volatile memory to which the installed control program is at least partially loaded, and at least one processor or central processing unit (CPU) for executing the loaded control program. Further, such a control program may be stored in electronic apparatuses other than the display apparatus 1a, 1b or 1c.

The control program may include a program(s) achieved in at least one form such as a basic input/output system (BIOS), a device driver, an operating system, a firmware, a platform, and an application program (App). According to an embodiment, the application program may be previously installed or stored in the display apparatus 1a, 1b or 1c when the display apparatus 1a, 1b or 1c is manufactured, or may be received in the future as application program data from the outside and installed in the display apparatus 1a, 1b or 1c based on the received data. The application program data may be for example downloaded from an application market or the like external server into the display apparatus 1a, 1b or 1c. Such an external server may be an example of the computer program product according to the disclosure, but there are no limits to the computer program product.

The controller 305 may for example control the image receiver 301 to receive an image signal of 360-degree VR content. The controller 305 controls the image processor 302 to perform image processing with regard to an image signal, and controls the display 303 to display the output image 206. In the display apparatus 1a, 1b or 1c shown in FIG. 3, the image processor 302 and the controller 305 are individually provided, but this is merely an example. Alternatively, the display apparatus 1a, 1b or 1c may be materialized by integrating the image processor and the controller.

Figure 4:
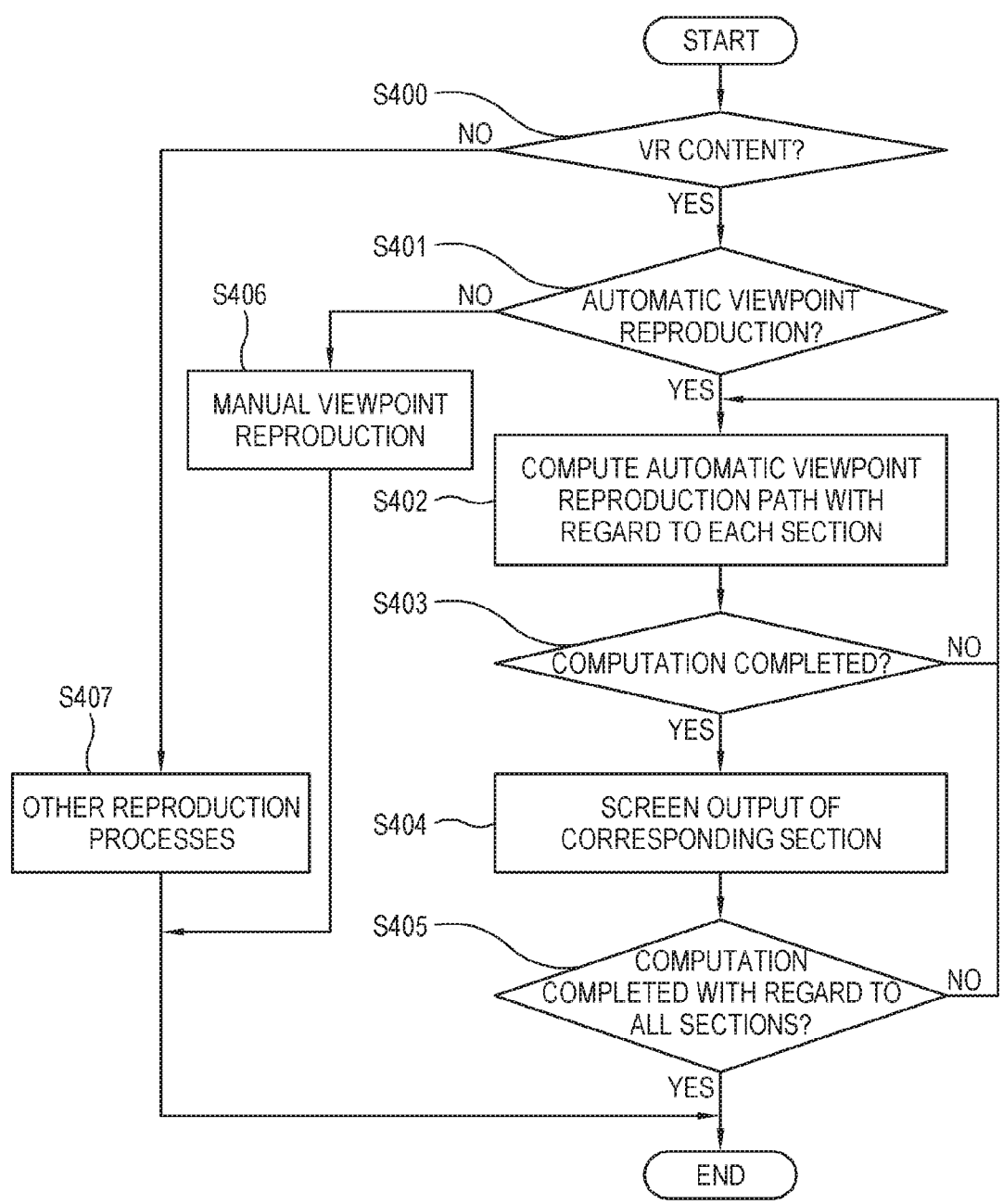
FIG. 4 is a flowchart showing operations of a display apparatus according to an embodiment.

Below, the controller 305 according to an embodiment will be described in detail. FIG. 4 is a flowchart showing operations of a display apparatus according to an embodiment. First, the controller 305 determines whether content to be processed is the 360-degree VR content (operation S400). As a result of determination in the operation S400, when it is determined that the content to be processed is the 360-degree VR content, the controller 305 determines whether to perform the automatic viewpoint reproduction (operation S401). As a result of determination in the operation S401, when it is determined that a user selects automatic viewpoint reproduction, the controller 305 computes a path needed for automatic viewpoint reproduction (hereinafter referred to as an 'automatic viewpoint reproduction path') with regard to a partial section of the content (operation S402). The controller 305 may determine a viewpoint involved in the automatic viewpoint reproduction path according to frames that constitute the content. The controller 305 may for example determine the viewpoint involved in the automatic viewpoint reproduction path based on a region in which a user is interested (hereinafter, 'referred to as a region of interest') within the frame.

Figure 5:
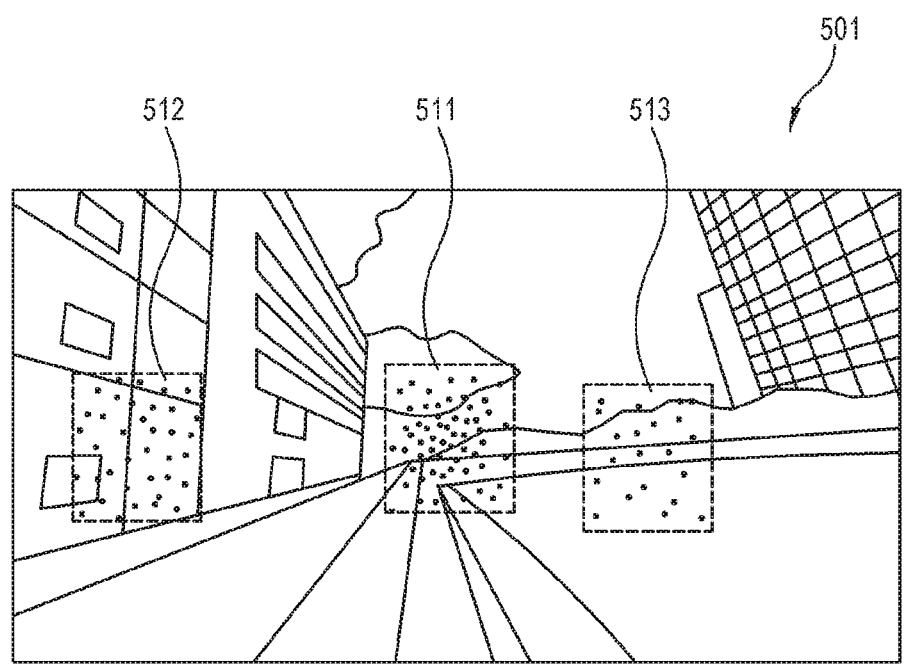
FIGS. 5 and 6 illustrate regions of interest in a display apparatus according to an embodiment.
Figure 6:
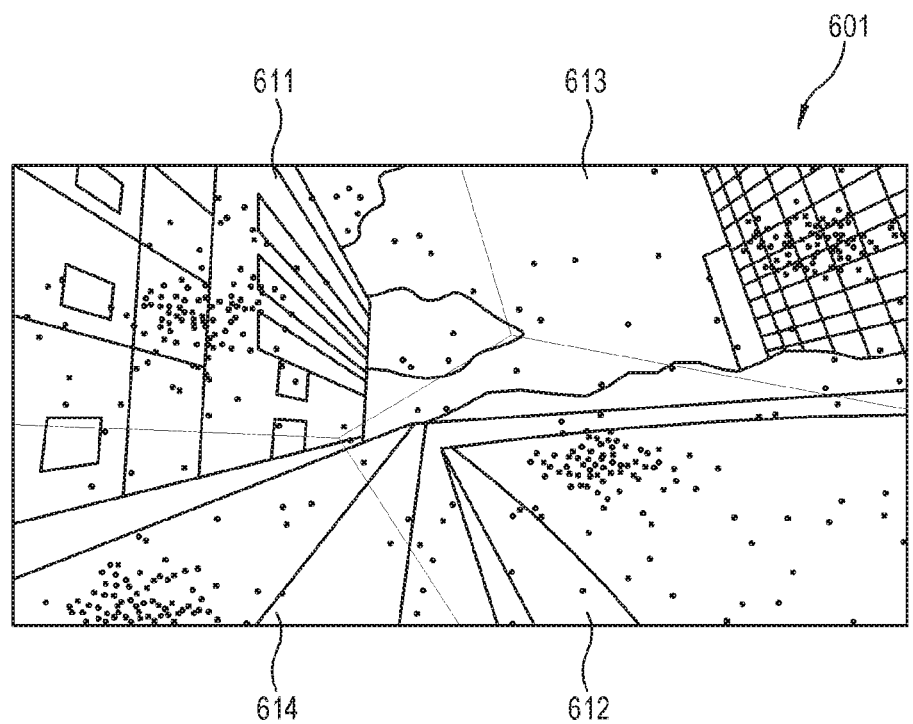

FIGS. 5 and 6 illustrate regions of interest in a according to an embodiment. The reference numeral of '501' in FIG. 5 may for example indicate one among a plurality of frames that constitute the 360-degree VR content. The frame 501 is an image corresponding to a certain process among images 201 to 206 corresponding to many processes shown in FIG. 2. For example, the frame 501 may be the stitching image 202. In FIG. 5, the reference numerals of '511, 512 and 513 indicate a user's regions of interest within the frame 501. According to an embodiment, the region of interest refers to a region at which a user stares for a predetermined period of time or more or a region where multiple users more than a predetermined number looks, i.e. a region that a user prefers. Alternatively, the region of interest may refer to a region, which is expected or estimated to be preferred by a user, within the frame 501. Referring to FIG. 5, a user's interest in the regions 511, 512 and 513 of interest is higher than that in the other regions. Further, the regions 511, 512 and 513 of interest may be relatively different in a user's interest from one another. For example, a user's interest in a second region 512 of interest may be higher than that in a third region 513 of interest, and a user's interest in a first region 511 of interest may be higher than that in the second region 512 of interest.

The controller 305 of the display apparatus 1a, 1b or 1c according to an embodiment may collect information about regions corresponding to a user's viewpoint as the viewpoint moves when content is reproduced before performing the automatic viewpoint reproduction. The controller 305 determines a user's region of interest based on the collected information. The above described method of determining the region of interest is merely an embodiment, and not construed as limiting the disclosure. For example, information about the region of interest may be added to content, and thus the controller 305 may determine where the regions of interest are present within the frame, based on the information added to the content. Alternatively, the controller 305 may receive information about the regions of interest from the server or other external devices 1d.

FIG. 6 shows an example of representing the regions of interest according to the areas on the frame according to an embodiment. In FIG. 6, dots indicate points in which a user is interested in within a frame 601. Taking a clumped distribution pattern of the dots into account, the frame 601 may be divided into a predetermined number of regions. Referring to FIG. 6, the frame 601 is divided into four regions 611 to 614, and the corresponding regions 611 to 614 are regarded as the regions of interest. The distribution degree of the dots, the number of divided regions, and the like in the foregoing are merely an embodiment, and there are no limits to the method of determining the region of interest according to the areas.

FIG. 7 illustrates an example of a path based on automatic viewpoint reproduction in a display apparatus 1a, 1b or 1c according to an embodiment. The controller 305 may determine an automatic viewpoint reproduction path 701 as shown in FIG. 7 with regard to a plurality of frames F1 to F4. The frames F1 to F4 shown in FIG. 7 may be continuous frames to be reproduced in sequence, or may include at least one frame between the frames F1 to F4. Referring to FIG. 7, a plurality of points to be determined as the viewpoints are represented in the form of a matrix 700 leaving a predetermined space in between on each of the frames F1 to F4. In FIG. 7, the reference numerals of 'P1' to 'P4' indicate viewpoints selected for the automatic viewpoint reproduction path in each of the frames F1 to F4. The controller 305 may determine the viewpoints P1 to P4 of the automatic viewpoint reproduction path based on the regions of interest (see the reference numerals of '511' to '513' and '611' to '614' in FIGS. 5 and 6) in each of the frames F1 to F4.

FIG. 8 is a method of determining a path based on automatic viewpoint reproduction in a display apparatus 1a, 1b or 1c according to an embodiment. In the display apparatus 1a, 1b or 1c according to an embodiment, the controller 305 considers a plurality of cases when a point (hereinafter, referred to as 'coordinates' or 'output coordinates') corresponding to a certain viewpoint on the frame is moved to coordinates corresponding to the next viewpoint. That is, when coordinates are determined corresponding to one among the plurality of cases, the controller 305 considers a value (hereinafter, referred to as 'connecting line score') calculated per coordinate of each case. The controller 305 may calculate the connecting line score based on the expression 800 shown in FIG. 8. Specifically, based on the expression 800 of FIG. 8, the controller 305 calculates a difference 801 between d-ranking coordinates of an (n) viewpoint and d-ranking coordinates of a (n−1) viewpoint and an importance 802 of d-ranking coordinates the (n) viewpoint, and obtains a connecting line score 803 at the d-ranking of the (n) viewpoint with regard to the (d−1) ranking of the (n) viewpoint. According to an embodiment, the importance 802 may be determined based on a user's interest in the region of interest described with reference to FIGS. 5 and 6. In the expression 800 of FIG. 8, K refers a weighted value of a distance. L refers to a weighted value of the importance. M refers to a mode value. Specifically, when M is low, movement of a viewpoint is long and frequently occurs, and thus relatively dynamic viewing is possible. On the other hand, when M is high, relatively stable viewing is possible with less movement of a viewpoint.

Among the plurality of cases, the controller 305 selects coordinates of which the connecting line score has a high value. The controller 305 determines the automatic viewpoint reproduction path based on the coordinates selected in the frames F1 to F4. The lower side of FIG. 8 shows an example where the coordinates to be included in the automatic viewpoint reproduction path are determined with respect to three frames F1 to F3 reproduced in sequence. When the path begins at the 1-ranking point of the first frame F1, the connecting line score is varied depending on the importance in the next frame F2. Referring to FIG. 8, the coordinates having a higher connecting line score with regard to the 1-ranking point of the frame F1 are determined as the 2-ranking point in the next frame F2 (2.4>0.26). Then, the coordinates having a higher connecting line score with regard to the 2-ranking point in the frame F2 are determined as the 1-ranking point of the frame 3 (3.41>0.04). Therefore, in the example shown in FIG. 8, the controller 305 selects the 1-ranking coordinates in the frame F1, the 2-ranking coordinates in the frame F2, and the 1-ranking coordinates in the frame F3 for the automatic viewpoint reproduction path. The method of using the foregoing expression to determine the automatic viewpoint reproduction path based on is merely an example, and may alternatively use another expression.

Referring back to FIG. 4, at operation S402, the controller 305 computes the automatic viewpoint reproduction path according to partial sections. That is, the controller 305 divides content into a plurality of sections, and computes the automatic viewpoint reproduction path with regard to each divided section. There are no limits to the number of sections into which the content is divided, but the number of sections may be properly set in consideration of computation performance of the display apparatus 1a, 1b or 1c, or the automatic viewpoint reproduction speed, etc. The controller 305 may determine the number of sections, the length of the section, etc. in accordance with content. Thus, the sections of the content may be properly determined based on the subject, length, etc. of content. Next, when the automatic viewpoint reproduction path is fully computed with regard to a certain section (YES at operation S403), the controller 305 reproduces this section (operation S404). That is, the controller 305 controls the display 303 to display the output image 206 having certain coordinates as the viewpoint while sequentially moving between the coordinates of the frames within the section along the automatic viewpoint reproduction path determined in the operation S402. Thus, the display apparatus performs the computations according to the sections in the automatic viewpoint reproduction mode, thereby reducing the quantity of computations to be processed for computing the path needed for moving the viewpoint.

In detail, according to an embodiment, the controller 305 or a processor, (1) map a frame of a content on a three-dimensional object, (2) identify output coordinates corresponding to a viewpoint which changes according to a user input while the content is played back, and (3) control the display to display a region of the frame mapped on the three-dimensional object based on the identified output coordinates. Further, the controller 305 or the processor (4) identify first output coordinates of frames involved in a first section of the content; (5) playback the first section of the content based on the identified first output coordinates; (6) after the playback of the first section of the content is started, identify second output coordinates of frames involved in a second section of the content based on at least one of the first output coordinates, the second section following the first section; and (7) playback the second section of the content based on the identified second output coordinates.

According to the above embodiment, the controller 305 or the processor identifies second output coordinates of the second section of the content, after the playback of the first section of the content, based on the identified first output coordinates. Thus, the resources needed to identify the second output coordinates decreases as it is based on the first output coordinates which is already identified.

Next, the controller 305 checks whether the computations are completed with regard all the sections of the content (operation S405). In the checking result of the operation S405, when the computations are not completed yet with regard all the sections (NO in the operation 405), the controller 305 performs computation for the automatic viewpoint reproduction path with regard to the subsequent section. On the other hand, in the checking result of the operation S405, when the computations are completed with regard all the sections (YES in the operation S405), the controller 305 terminates the operations. Meanwhile, as a result of determination in the operation S401, when the automatic viewpoint reproduction is not selected, the controller 305 performs manual reproduction, in which the viewpoint is moved in response to a user's input (operation S406). On the other hand, as a result of determination in the operation S400, when content to be processed is not the VR content, the controller 305 performs a predetermined reproduction process with regard to this content (operation S407).

FIG. 9 shows two example processes of the automatic viewpoint reproduction. Specifically, the reference numeral of '901' shows the process of the automatic viewpoint reproduction after computation is performed with regard to full sections of content, and the reference numeral of '902' shows the computations according to the individual sections and the process of the automatic viewpoint reproduction according to an embodiment content. In the case of the automatic viewpoint reproduction 901 after the computations are performed with regard to the whole sections, the automatic viewpoint reproduction path is fully computed with regard to the whole sections of the content, and then the content is reproduced along the computed automatic viewpoint reproduction path.

On the other hand, the controller 305 according to an embodiment performs the computation according to the sections of the content in parallel with the automatic viewpoint reproduction (see the reference numeral of '902'). Specifically, the controller 305 first computes the automatic viewpoint reproduction path with regard to the section n0 (see the reference numeral of '921'). Next, when the computation of the automatic viewpoint reproduction path is completed with regard to the section n0, the controller 305 controls the content to be reproduced along the computed automatic viewpoint reproduction path with regard to the section n0 (see the reference numeral of '925'). Further, the controller 305 computes the automatic viewpoint reproduction path with regard to the section n1 (see the reference numeral of '922') while reproducing the content corresponding to the section n0 so that the next section n1 can be reproduced in succession to the ongoing section n0. Likewise, the controller 305 performs the computation for the automatic viewpoint reproduction path of the next section in parallel with the automatic viewpoint reproduction of the current section (see the reference numeral of '923,' '924,' '926,' '927,' and '928').

As shown in FIG. 9, when the computation of the automatic viewpoint reproduction path is performed at a time with regard to the whole sections of the content (see the reference numeral of '901'), it takes time of Ta (see the reference numeral of '911') for the whole computation. On the other hand, according to an embodiment, when the computation and the reproduction are divisionally performed according to the sections (see the reference numeral of '902'), it takes time of T0, T1, T2 and T3 (see the reference numeral of '921' to '924') for the computations of the respective sections. In this case, it takes the time of T0 (921) to start the reproduction. That is, the standby time T0 to wait before starting the initial reproduction according to an embodiment is shorter than the standby time Ta of when the path are computed at once with regard to the whole sections, thereby improving user convenience.

Figure 10:
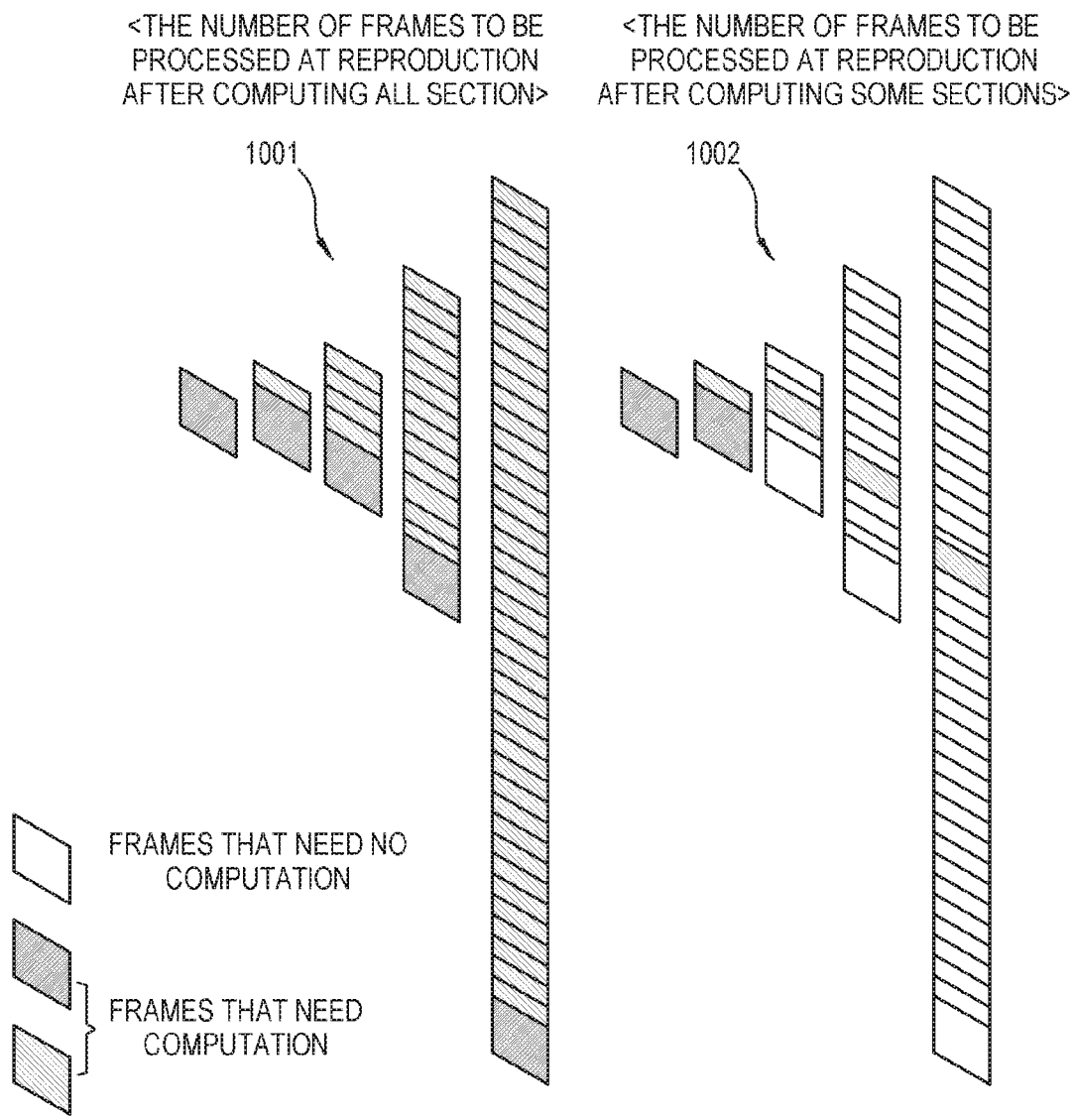

FIG. 10 shows comparison in the quantity of computations between the reproduction after the computation of the whole sections and the reproduction based on the computations corresponding to the sections according to an embodiment according to the sections in FIG. 9. Specifically, the reference numeral of '1001' shows the number of frames to be processed at the reproduction after the computation of the whole sections, and the reference numeral of '1002' shows the number of frames to be processed at the reproduction based on the computation corresponding to each individual section according to an embodiment. In FIG. 10, it will be assumed that the number of cases (or frames) to be taken into account is N with regard to movement from coordinates of a certain viewpoint to coordinates of the next viewpoint. First, the number of cases at the reproduction after computing the whole sections is exponentially increased as the sections increase (see the reference numeral of '1001'). Therefore, the total number of cases up to the Kth frame section F(K) is $N^K$ when the whole sections are fully computed and then reproduced. Accordingly, in the case where the whole sections are entirely computed and then reproduced, the total quantity of computations is $N*(N^K-1)/(N-1)$.

On the other hand, according to an embodiment, the number of cases at the computation and reproduction corresponding to each individual section is not increased but constantly kept as N even though the sections increase (see the reference numeral of '1002'). Therefore, the quantity of computations is $N^2$ at the Kth frame section F(K) (except the 1st section) when each individual section is computed and then reproduced. Accordingly, the total quantity of computations is $K*N^2$ in the case where each individual section is computed and then reproduced. As N and K increase, the difference in the quantity of computations between the reproduction after computing the whole sections and the reproduction based on the computation corresponding to each individual section becomes greater. According to an embodiment, the total quantity of computations needed for the automatic viewpoint reproduction is decreased, thereby minimizing a computation burden. Further, according to an embodiment, even when the automatic viewpoint reproduction is stopped by a user's input for manually moving a viewpoint and then resumed, it is possible to remarkably reduce the quantity of computations needed for computing the path again.

Figure 11:
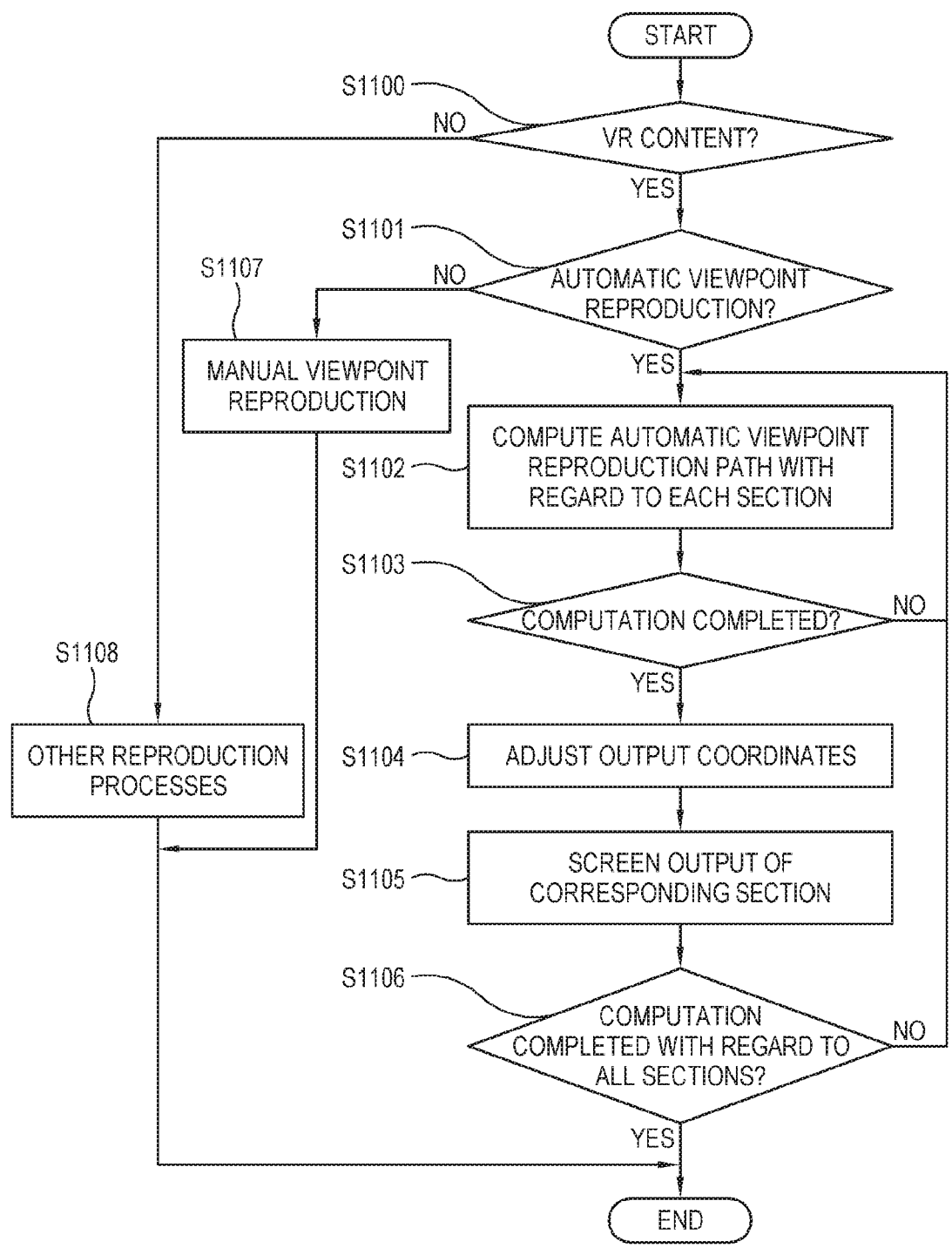
FIG. 11 is a flowchart of showing operations of a display apparatus according to another embodiment.

FIG. 11 is a flowchart of showing operations of a display apparatus according to another embodiment. In terms of describing the display apparatus shown in FIG. 11, repetitive descriptions will be avoided as necessary with regard to the same or similar configurations as those of the display apparatus described with reference to FIGS. 4 to 10. First, operations S1100 to S1103 in FIG. 11 may be performed like the operations S400 to S403 described in FIG. 4. Next, when the computation of the automatic viewpoint reproduction path is completed with regard to a certain section (operation S1103), the controller 305 adjusts the output coordinates of this section (operation S1104). Below, adjustment of the output coordinates according to an embodiment will be described in detail with reference to FIGS. 12 to 18.

Figure 12:
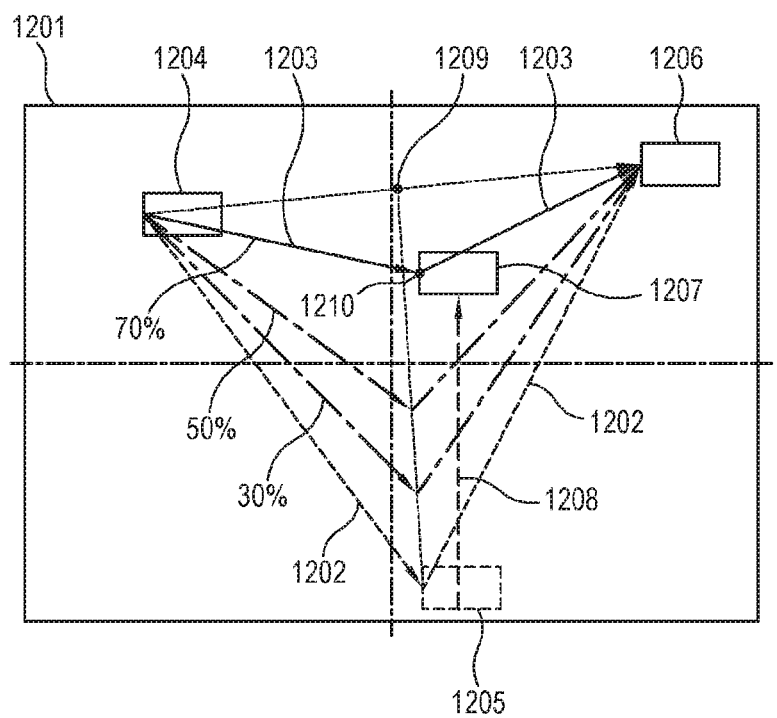
FIGS. 12 to 18 illustrate examples of adjusting output coordinates in a display apparatus according to an embodiment.

FIG. 12 shows a path based on automatic viewpoint reproduction according to an embodiment. Specifically, the reference numeral of '1202' indicates the automatic viewpoint reproduction path resulting from the computation described with reference to FIGS. 4 to 11 (hereinafter, referred to as an 'original path'), and the reference numeral of '1203' indicates a path acquired by adjusting the output coordinates with respect to the original path 1202 (hereinafter, referred to as an 'adjusted path'). Further, the reference numerals of '1204' to '1207' indicate output regions in the frame 1201 corresponding to the viewpoints moving along the path. FIG. 12 shows that the plurality of frames 1201 having the plurality of output regions 1204 to 1207 moving in accordance with the viewpoints are overlapped. That is, in the original path 1202, the viewpoint is expected to move in order of the first output region 1204, the second output region 1205 and the third output region 1206. Hereinafter, 'change in output coordinates according to movement of a viewpoint' according to an embodiment will be simply called 'the movement of the viewpoint' or 'the change in the output coordinates.'

According to an embodiment, the controller 305 adjusts the output coordinates on the original path 1202, and determines an adjusted path 1203 where the viewpoint is less moved. The controller 305 may obtain the adjusted path 1203 by adjusting the original path 1202 with regard to the output coordinates of every frame, or may obtain the adjusted path 1203 by sampling the output coordinates of some frames from the original path 1202 and adjusting the original path 1202 with regard to the sampled output coordinates. That is, the first output region 1204, the second output region 1205 and the third output region 1206 may be the output regions of the successive frames, or may be the output regions of some sampled frames.

In the adjusted path 1203 shown in FIG. 12, the viewpoint moves in order of the first output region 1204, the fourth output region 1207 and the third output region 1206. The controller 305 determines the adjusted path 1203 based on relative positions between the first output region 1204, the second output region 1205 and the third output region 1206 on the original path 1202. Specifically, the controller 305 may replace the second output region 1205 with the fourth output region 1207 relatively closer to a straight path between the first output region 1204 and the third output region 1206 than the second output region 1205 with regard to the first output region 1204, the second output region 1205 and the third output region 1206.

According to an embodiment, the controller 305 determines a first point 1209 between the output coordinates of the first output region 1204 and the third output region 1206. For example, the first point 1209 may be an intermediate point on the moving path from the first output region 1204 to the third output region 1206. Next, the controller 305 determines a second point 1210 between the first point 1209 and the output coordinates of the second output region 1205. For example, the second point 1210 may be a point corresponding to 70% of a distance from the output coordinates of the second output region 1205 to the first point 1209. That is, the controller 305 may determine the position of the second point 1210 in accordance with how much less the view point moves. The controller 305 determines the fourth output region 1207 where the determined second point 1210 is regarded as the output coordinates. This method is merely an example, and is not construed as limiting the disclosure.

Alternatively, the controller 305 may set the fourth output region 1207 with a region having certain output coordinates within a space formed by the first output region 1204, the second output region 1205 and the third output region 1206. As shown in FIG. 12, the adjusted path 1203 involves less change in the movement of the viewpoint as compared with that of the original path 1202 (see the reference numeral of '1208'), thereby relieving dizziness a user may feel during automatic viewpoint reproduction.

Figure 13:
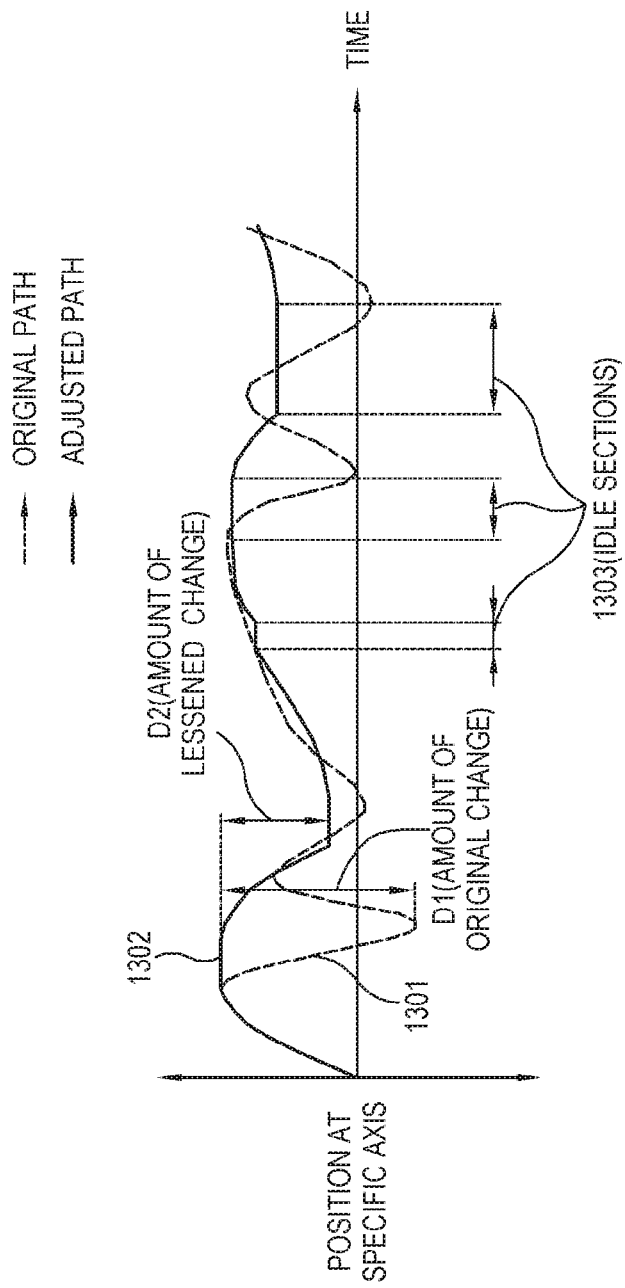
Figure 14:
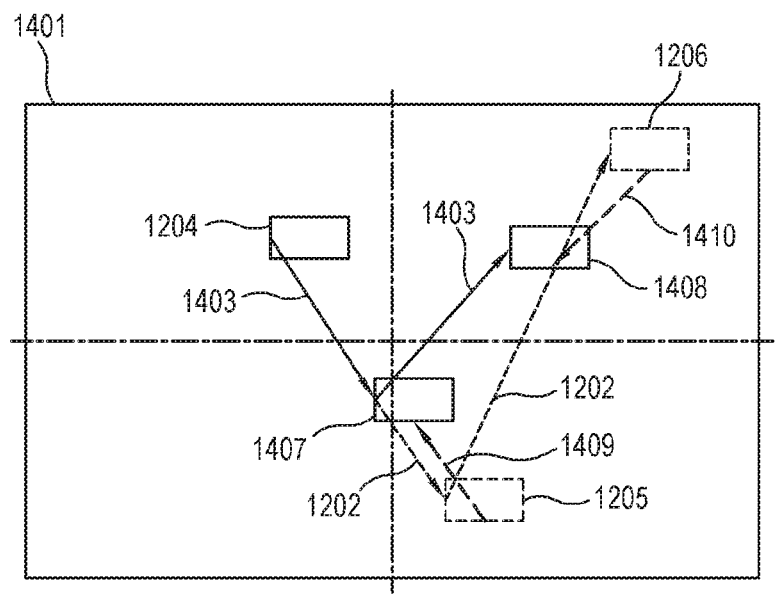

FIG. 13 shows an original path 1301 and an adjusted path 1302 according to an embodiment. The original path 1301 and the adjusted path 1302 shown in FIG. 3 respectively correspond to but do not exactly the same with the original path 1202 and the adjusted path 1203 shown in FIG. 12. Specifically, FIG. 13 shows position changes in the original path 1301 and the adjusted path 1302 with respect to their specific axes as time goes on. For example, the specific axes of FIG. 3 may correspond to a transverse direction of the frame. However, this is merely an example, and does not limit the disclosure. Referring to FIG. 13, the amount of change between the viewpoints moving along the original path 1301 is D1, whereas the amount of change between the viewpoints moving along the adjusted path 1302 is D2 less than D1. Therefore, according to an embodiment, dizziness a user may feel is more relieved as much as the lessened change in movement between the viewpoints. FIG. 14 shows another example of the adjusted path in frame 1401 according to an embodiment. In terms of describing the embodiment of FIG. 14, repetitive descriptions about the same or similar configurations as those of the display apparatus described with reference to FIG. 12 will be avoided. According to an embodiment, the controller 305 determines an adjusted path 1403 by adjusting the output coordinates in the original path 1202. In the adjusted path 1403 shown in FIG. 14, the viewpoint moves in order of the first output region 1204, a fifth output region 1407 and a sixth output region 1408. As shown in FIG. 14, the adjusted path 1403 involves less change in the movement of the viewpoint as compared with that of the original path 1202 (see the reference numeral of '1409' and '1410'). According to an embodiment, the controller 305 may determine the adjusted path 1403 by reducing a moving amount or a moving distance (hereinafter, referred unitedly to as the 'moving amount') between the viewpoints. For example, according to an embodiment, when the moving amount of the viewpoint moving from the first output region 1204 to the second output region 1205 of FIG. 14 is '10', the controller 305 may adjust the output coordinates of the adjusted path 1403 to have a moving amount of '7', i.e. 70% of the moving amount (see the reference numeral of '1407' and '1408'). Here, the value of 70% is an arbitrary value given for convenience of description, and may be set to a different value.

This method is merely an embodiment of lessening the movement of the viewpoint, and does not limit the method of making the viewpoint be less moved according to the disclosure. For example, as another example of lessening the movement of the viewpoint according to the disclosure, at least one of moving speed and moving acceleration of the viewpoint may be restricted. In other words, the controller 305 may adjust the moving speed of the viewpoint by reducing the moving amount of the viewpoint according to predetermined time sections. Likewise, the controller 305 may adjust the moving acceleration of the viewpoint by lowering the moving speed of the viewpoint according to predetermined time sections. Specifically, referring to FIG. 12, when the speed (or acceleration) of the viewpoint moving from the first output region 1204 to the second output region 1205 is '10', the controller 305 may adjust the output coordinates of the adjusted path by restricting the moving speed to '7'.

Figure 15:
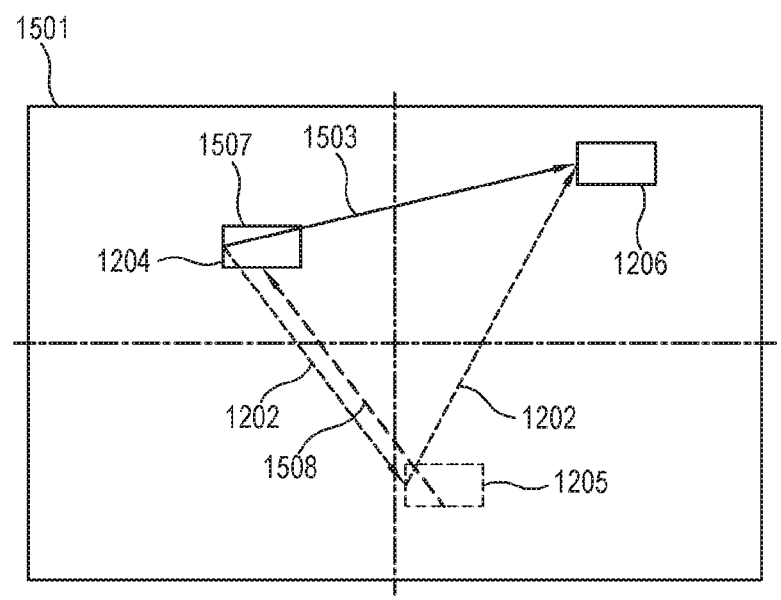

In an embodiment, the controller 305 may differently set a degree of lowering the moving speed (or acceleration) of the viewpoint according to plural time sections. That is, the controller 305 may increase the degree of lowering the moving speed in a time section where the moving speed of the viewpoint is high, and decrease the degree of lowering the moving speed in a time section where the moving speed of the viewpoint is low. Thus, the moving speed (or acceleration) is properly lowered according to time sections, thereby obtaining the adjusted path more adaptively and more smoothly coping with the change in the viewpoint FIG. 15 shows another example of the adjusted path in frame 1501 according to an embodiment. In terms of describing the embodiment of FIG. 15, repetitive descriptions about the same or similar configurations as those of the display apparatus described with reference to FIGS. 12 and 14 will be avoided. According to an embodiment, the controller 305 determines an adjusted path 1503 by adjusting the output coordinates of the original path 1202. In the adjusted path 1503 shown in FIG. 15, the viewpoint moves in order of the first output region 1204, a seventh output region 1507 and the third output region 1206. That is, according to an embodiment, the controller 305 determines the adjusted path 1503 by skipping over some viewpoint moving processes of the original path 1202 to lower the amount of change (see the reference numeral of '1508'). For example, the controller 305 skips over the viewpoint moving from the first output region 1204 to the second output region 1205 on the original path 1202 shown in FIG. 15, and then computes the adjusted path 1503 directed toward the next viewpoint, i.e. the third output region 1206. In this case, a seventh output region 1507 is displayed at the same viewpoint as the first output region 1204 without moving the viewpoint after displaying the first output region 1204, and then the viewpoint moves to the third output region 1206. Based on a subject displayed on the second output region 1205, the controller 305 may determine whether to selectively skip over the viewpoint moving toward the second output region 1205. Specifically, the controller 305 may determine whether to skip over the viewpoint based on the information such as the importance 802 described with reference to FIG. 8. For example, the controller 305 may skip the viewpoint moving toward the second output region 1205 when the importance 802 of the coordinates in the second output region 1205 is lower than a predetermined threshold. Thus, it is determined whether to skip over the viewpoint based on the subjects at the output coordinates, and therefore a degree of relieving dizziness is properly controlled in accordance with the subjects of the content.

Figure 16:
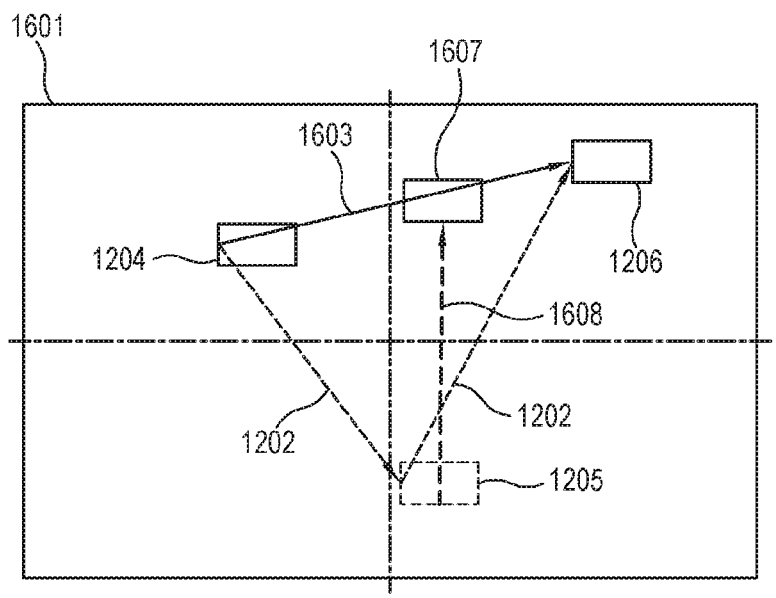

FIG. 16 shows another example of the adjusted path in frame 1601 according to an embodiment. In terms of describing the embodiment of FIG. 16, repetitive descriptions about the same or similar configurations as those of the display apparatus described with reference to FIGS. 12 and 14 will be avoided. In the adjusted path 1603 shown in FIG. 16, the output coordinates of the original path 1202 are adjusted to move the viewpoint in order of the first output region 1204, an eighth output region 1607, and the third output region 1206. According to an embodiment, as described above with reference to FIG. 15, the controller 305 may for example determine the adjusted path 1603 by interpolating an arbitrary eighth output region 1607 between the first output region 1204 and the third output region 1206 when it is desired to skip over the second output region 1205 on the original path 1202. Specifically, the controller 305 may determine the coordinates of the eighth output region 1607 so that the eighth output region 1607 can be positioned at a certain point on the adjusted path 1603 from the first output region 1204 to the third output region 1206. That is, the controller 305 may determine the eighth output region 1607 to be interpolated instead of the second output region 1205 in the frame of the second output region 1205 based on the determined coordinates (see the reference numeral of '1608').

In the adjusted path 1603 shown in FIG. 16, the viewpoint moves from the first output region 1204 to the third output region 1206 via the eighth output region 1607 interposed between them, thereby moving the viewpoint more naturally. Thus, the rapid movement of the viewpoint is changed into gradual movement by the interpolation, and therefore the viewpoint moves more naturally, thereby relieving dizziness a user may feel.

Figure 17:
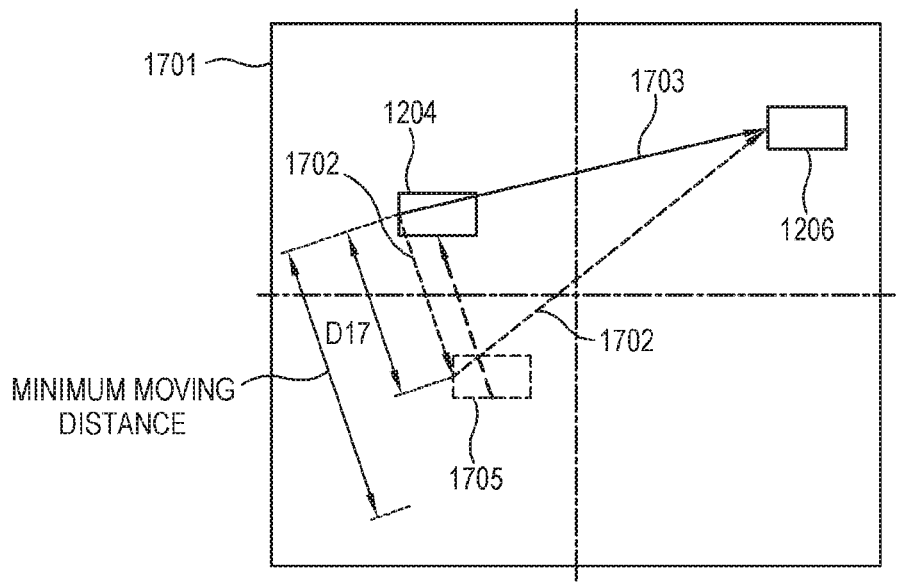
Figure 18:
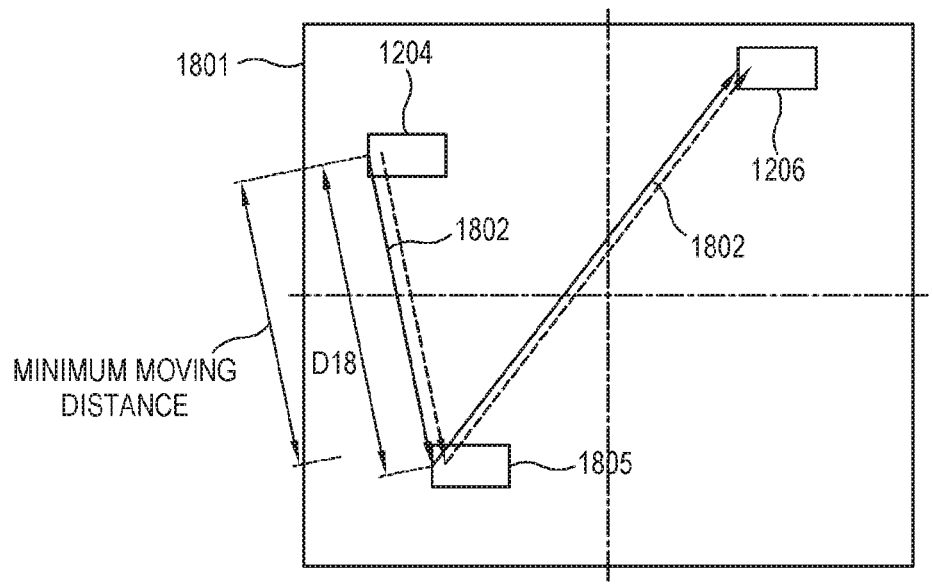

FIGS. 17 and 18 are still another example of the adjusted path according to an embodiment the adjusted path. In terms of describing the embodiment of FIGS. 17 and 18, repetitive descriptions about the same or similar configurations as those of the display apparatus described with reference to FIGS. 12 to 16 will be avoided. According to an embodiment, the controller 305 adjusts the output coordinates of the original path based on whether a distance between a certain viewpoint to another viewpoint is greater than a specific lower limit (hereinafter, referred to as 'the minimum moving distance'). Although there are no limits to what extent the minimum moving distance will be set, the minimum moving distance is set to be relatively minute and thus ignorable during the automatic viewpoint reproduction. The minimum moving distance may be previously set, or the controller 305 may set the minimum moving distance based on a user's input or a specific algorithm. First, referring to the example of frame 1701 shown in FIG. 17, a moving distance D17 of the viewpoint from the first output region 1204 to a ninth output region 1705 on an original path 1702 is shorter than the minimum moving distance. In this case, the controller 305 ignores the movement of the viewpoint from the first output region 1204 to the ninth output region 1705, and then computes an adjusted path 1703 to move the viewpoint to the third output region 1206. On the other hand, referring to another example of frame 1801 shown in FIG. 18, a moving distance D18 of the viewpoint from the first output region 1204 to a tenth output region 1805 on an original path 1802 is greater than the minimum moving distance. In this case, the controller 305 controls the automatic viewpoint reproduction to be performed in consideration of the movement of the viewpoint to the tenth output region 1805 on the original path 1802. That is, the adjusted path is the same as the original path 1802. Therefore, according to this embodiment, the movement of the viewpoint is ignored when the moving distance of the viewpoint is relatively minute and shorter than the minimum moving distance, the change in the movement of the viewpoint is lessened, thereby relieving dizziness a user may feel. In this embodiment, the distance is employed in determining whether the viewpoint moves or not. However, this embodiment is merely an example, and an angle or the like may be for example used instead of the distance. Like this, the viewpoint is not frequently moved, and it is thus possible to relieve dizziness a user may feel.

Referring back to FIG. 13, the controller 305 according to an embodiment pauses the movement of the viewpoint for a predetermined section (hereinafter, referred to as an 'idle section' indicated with the reference numeral of '1303') during the automatic viewpoint reproduction, thereby adjusting the original path. Specifically, the controller 305 may determine whether to apply the idle section 1303 based on a degree of change in the viewpoint, a degree of user fatigue, etc. For example, when a degree of accumulated change in the viewpoint is greater than a predetermined threshold during the automatic viewpoint reproduction, a predetermined section after that viewpoint may be determined as the idle section 1303. Further, the controller 305 may periodically apply the idle section 1303 corresponding to a predetermined time length during the automatic viewpoint reproduction. The threshold for the degree of accumulated change in viewpoint, and the length, the cycle, the number of times, etc. of the idle section 1303 may be determined based on the degree of change in the viewpoint, a degree of user fatigue, etc. during the automatic viewpoint reproduction of the content. Thus, it is possible to further relieve dizziness a user may feel by a simpler method since the viewpoint has no movement in the idle section 1303.

Meanwhile, referring to FIG. 11, when the output coordinates are adjusted as described with reference to FIGS. 12 to 18 (operation S1104), operation S1105 to operation S1108 are performed like the operation S404 to the operation S407 described in FIG. 4.

Figure 19:
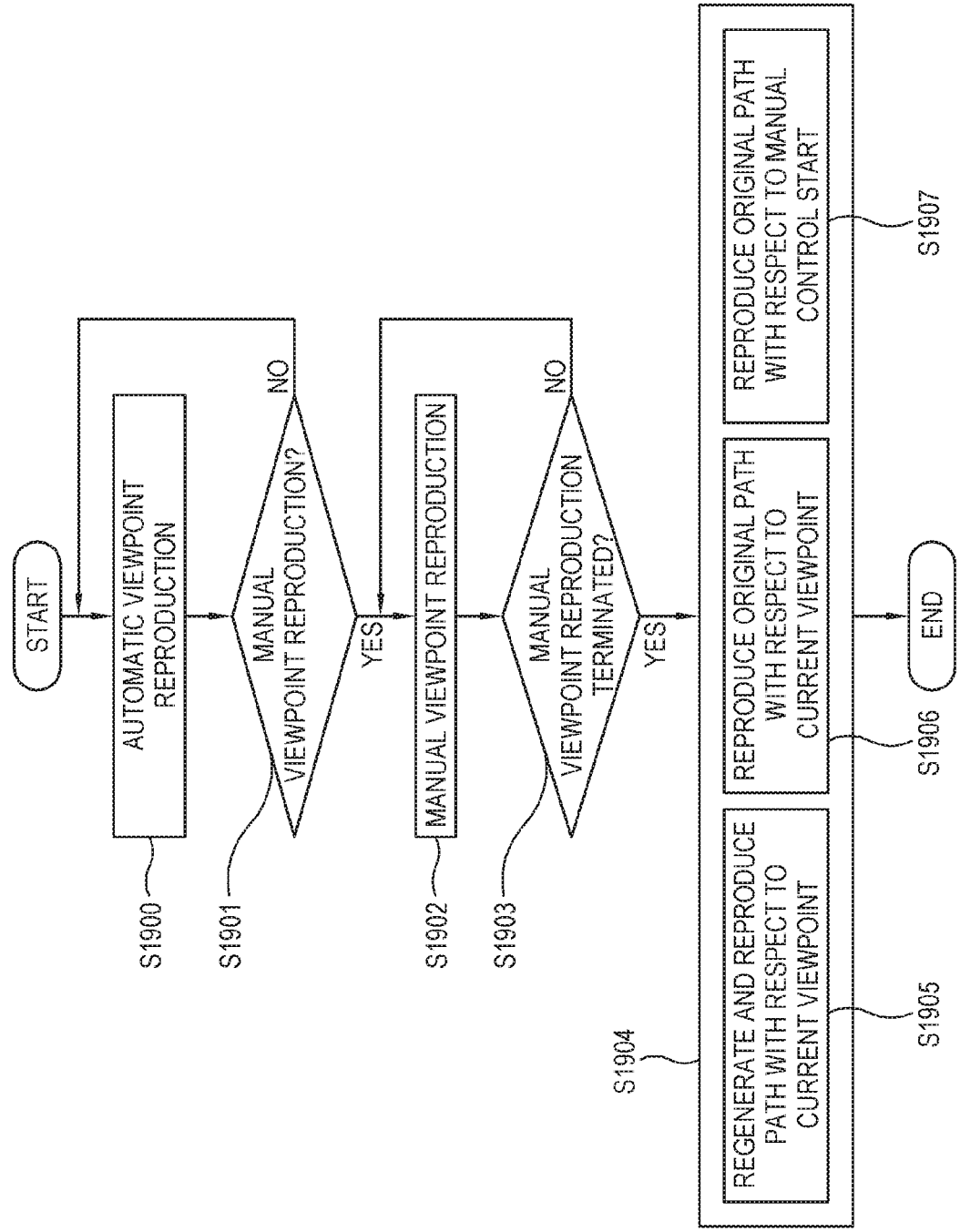
FIG. 19 is a flowchart of showing operations of a display apparatus according to another embodiment.

FIG. 19 is a flowchart of showing operations of a display apparatus according to still another embodiment. First, according to an embodiment, the controller 305 controls the automatic viewpoint reproduction to be performed as described above (operation S1900). Next, when a user's input is sensed during the automatic viewpoint reproduction, the controller 305 determines whether to switch over to a reproduction mode based on a user's input (hereinafter, referred to as a 'manual viewpoint reproduction') (operation S1901). As a result of the determination in operation S1901, in the case of switching over to the manual viewpoint reproduction (YES in the operation S1901), the controller 305 performs reproduction while moving the viewpoint in response to a user's input (operation S1902). On the other hand, in the case of switching over not to the manual viewpoint reproduction (NO in the operation S1901 No), the controller 305 continues the automatic viewpoint reproduction (operation S1900). Thus, user convenience is improved since the manual viewpoint reproduction directly begins in response to a user's input even during the automatic viewpoint reproduction.

Figure 20:
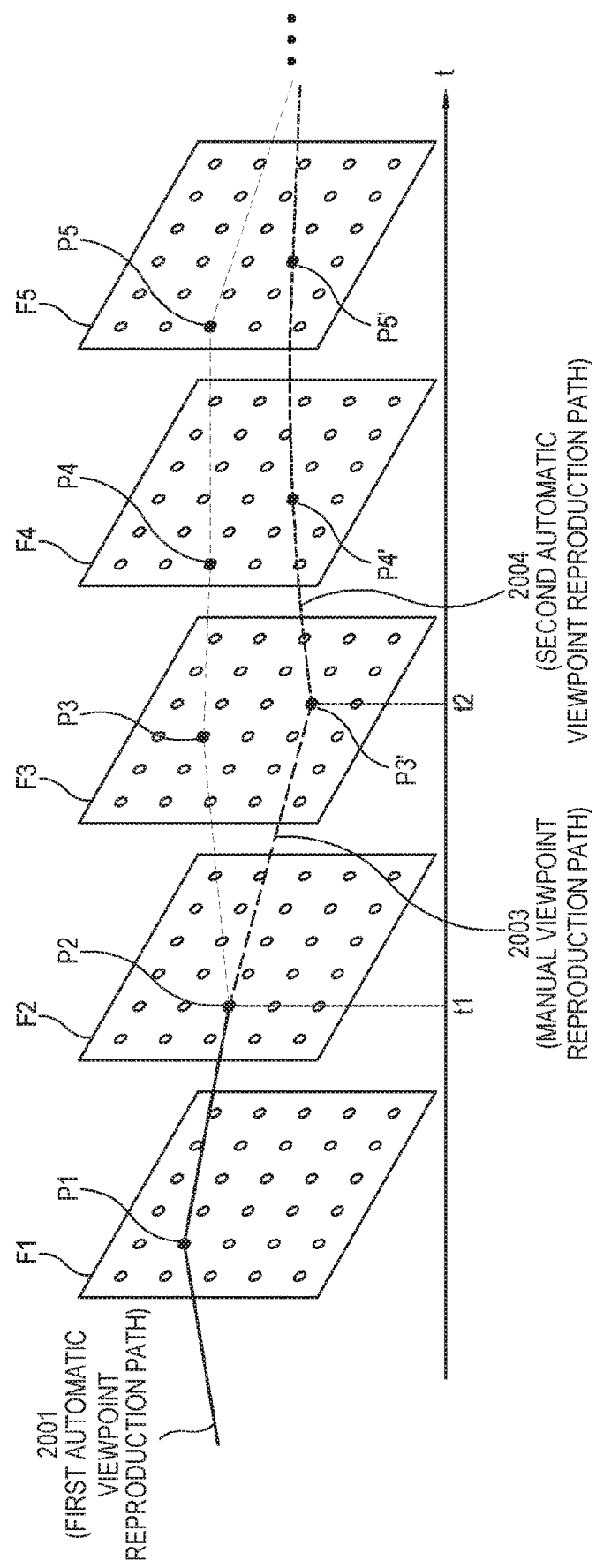
FIGS. 20 to 22 illustrate paths based on automatic viewpoint reproduction after terminating a manual operation in a display apparatus according to an embodiment.

Next, when it is determined that a user's input is not received any more, the controller 305 terminates the manual viewpoint reproduction and controls the automatic viewpoint reproduction to be resumed (YES in operation S1903). In this case, the controller 305 may resume the automatic viewpoint reproduction by one of many methods (operation S1904). As a specific example, the controller 305 computes the automatic viewpoint reproduction path again with respect to the current viewpoint, and resumes the automatic viewpoint reproduction with the re-computed automatic viewpoint reproduction path (operation S1905). FIG. 20 shows an example of resuming the automatic viewpoint reproduction after the manual viewpoint reproduction in the operation S1905 of FIG. 19. The controller 305 controls the movement of the viewpoint along a first automatic viewpoint reproduction path 2001 until a user's control is input. The first automatic viewpoint reproduction path 2001 includes the viewpoints P1 to P5 in the frames F1 to F5. When a user's control is input during the reproduction along the first automatic viewpoint reproduction path 2001, the controller 305 controls the viewpoint to move along the path 2003 based on the manual viewpoint reproduction (hereinafter, referred to as a 'manual viewpoint reproduction path') corresponding to a user's input. The manual viewpoint reproduction path 2003 goes from time t1 to time t2, i.e. moves from the viewpoint P2 of the frame F2 to the viewpoint P3' of the frame F3. Then, when a user's input is completed at the time t2, the controller 305 computes a second automatic viewpoint reproduction path 2004 again with respect to the viewpoint P3' of the current frame F3. Then, the controller 305 controls the viewpoints P4' and P5' of the frames F4 and F5 to move along the re-computed second automatic viewpoint reproduction path 2004.

Figure 21:
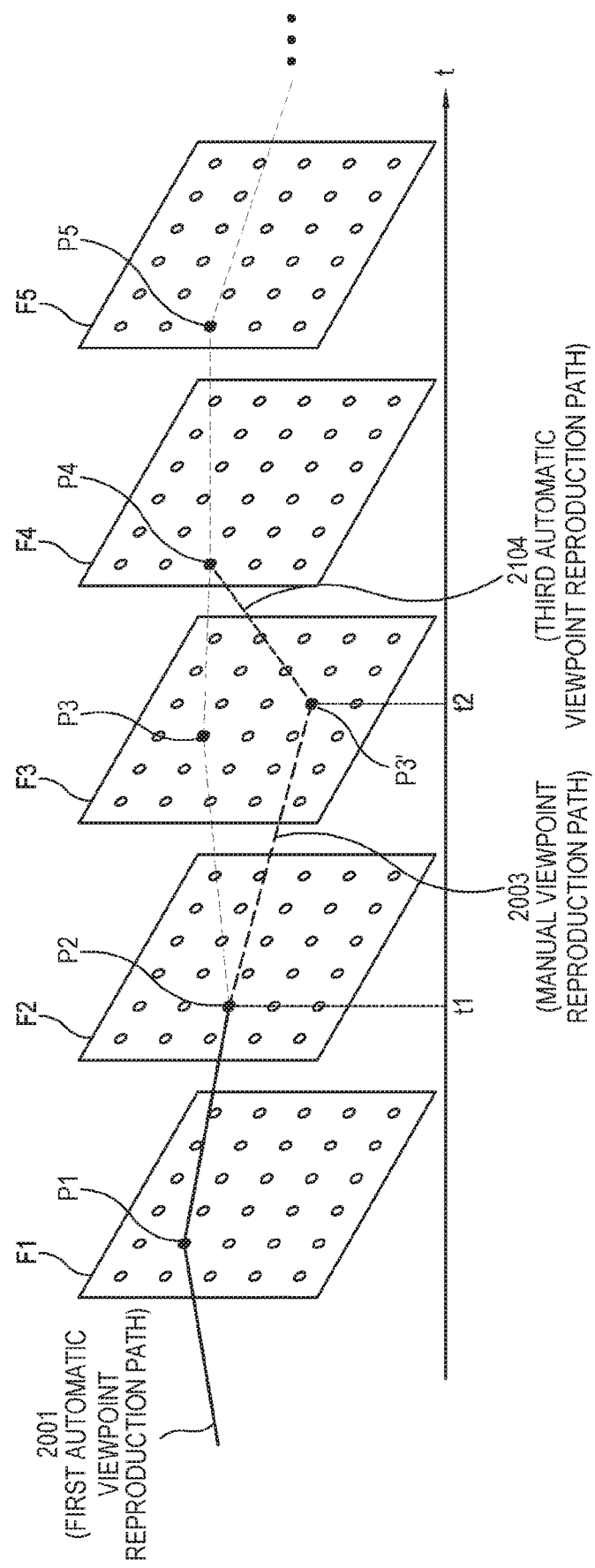

Alternatively, referring back to FIG. 19, the controller 305 may resume the automatic viewpoint reproduction along the original path with respect to the current viewpoint (operation S1906). FIG. 21 shows an example of resuming the automatic viewpoint reproduction after the manual viewpoint reproduction in the operation S1906 of FIG. 19. In the display apparatus shown in FIG. 21, repetitive descriptions about the same or similar configurations as the display apparatus described with reference to FIG. 20 will be avoided. As shown in FIG. 21, when a user's input is completed at time t2 after the viewpoint moves along the manual viewpoint reproduction path 2003 following the first automatic viewpoint reproduction path 2001, the controller 305 controls the viewpoint to move along a third automatic viewpoint reproduction path 2104 connected to the existing first automatic viewpoint reproduction path 2001 from the viewpoint P3' of the current frame F3. Then, the controller 305 controls the viewpoint to move along the existing first automatic viewpoint reproduction path 2001 from the frame F4.

Figure 22:
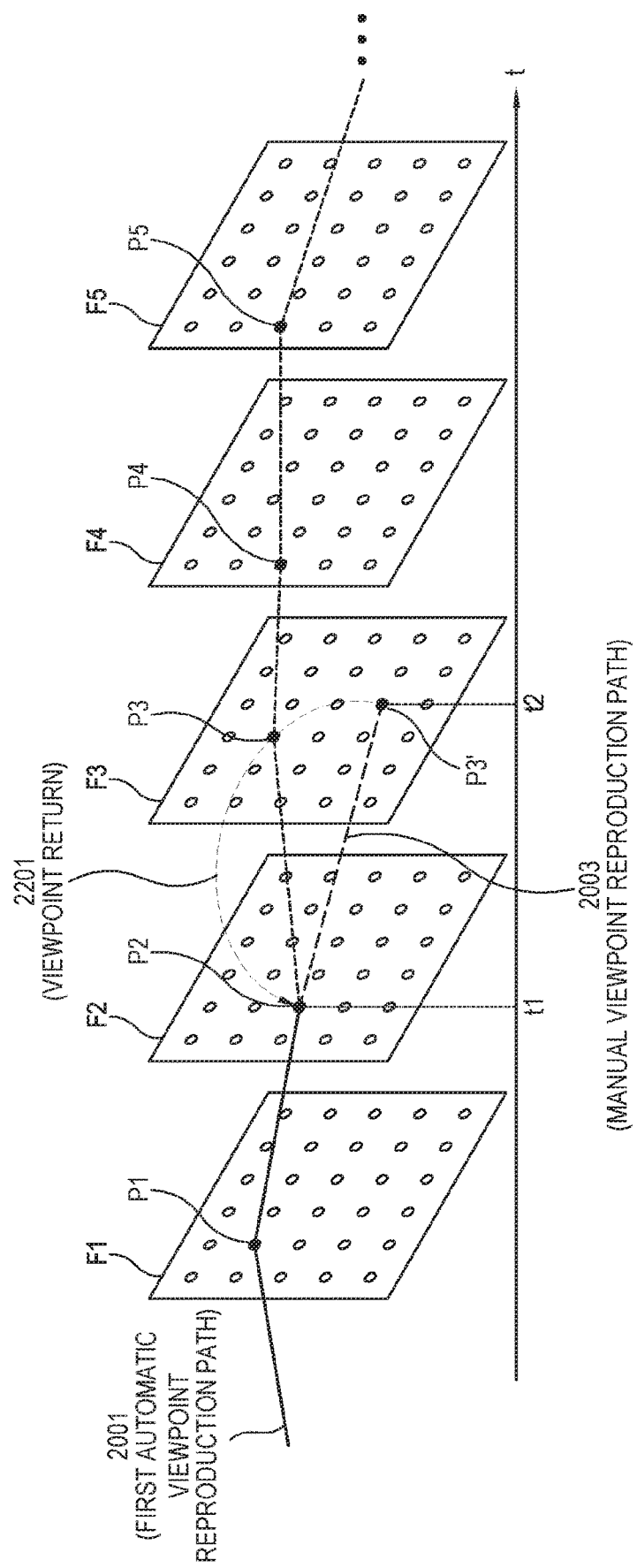

Alternatively, referring back to FIG. 19, the controller 305 may return to a point of time when the manual viewpoint reproduction begins and resume the automatic viewpoint reproduction based on the original path (operation S1907). FIG. 22 shows an example of resuming the automatic viewpoint reproduction after the manual viewpoint reproduction in the operation S1907 of FIG. 19. In the display apparatus shown in FIG. 22, repetitive descriptions about the same or similar configurations as the display apparatus described with reference to FIG. 20 will be avoided. As shown in FIG. 22, when a user's control is completed at time t2 after the viewpoint moves along the manual viewpoint reproduction path 2003 following the first automatic viewpoint reproduction path 2001, the controller 305 returns to the viewpoint P2 of the frame F2 corresponding to the time t1 at which a user's input is made on the existing first automatic viewpoint reproduction path 2001 (see the reference numeral of '2201'), and controls the viewpoint to move along the existing first automatic viewpoint reproduction path 2001. By various methods described with reference to FIGS. 20 to 22, the automatic viewpoint reproduction is resumed after the manual viewpoint reproduction to thereby improve user convenience.

Figure 23:
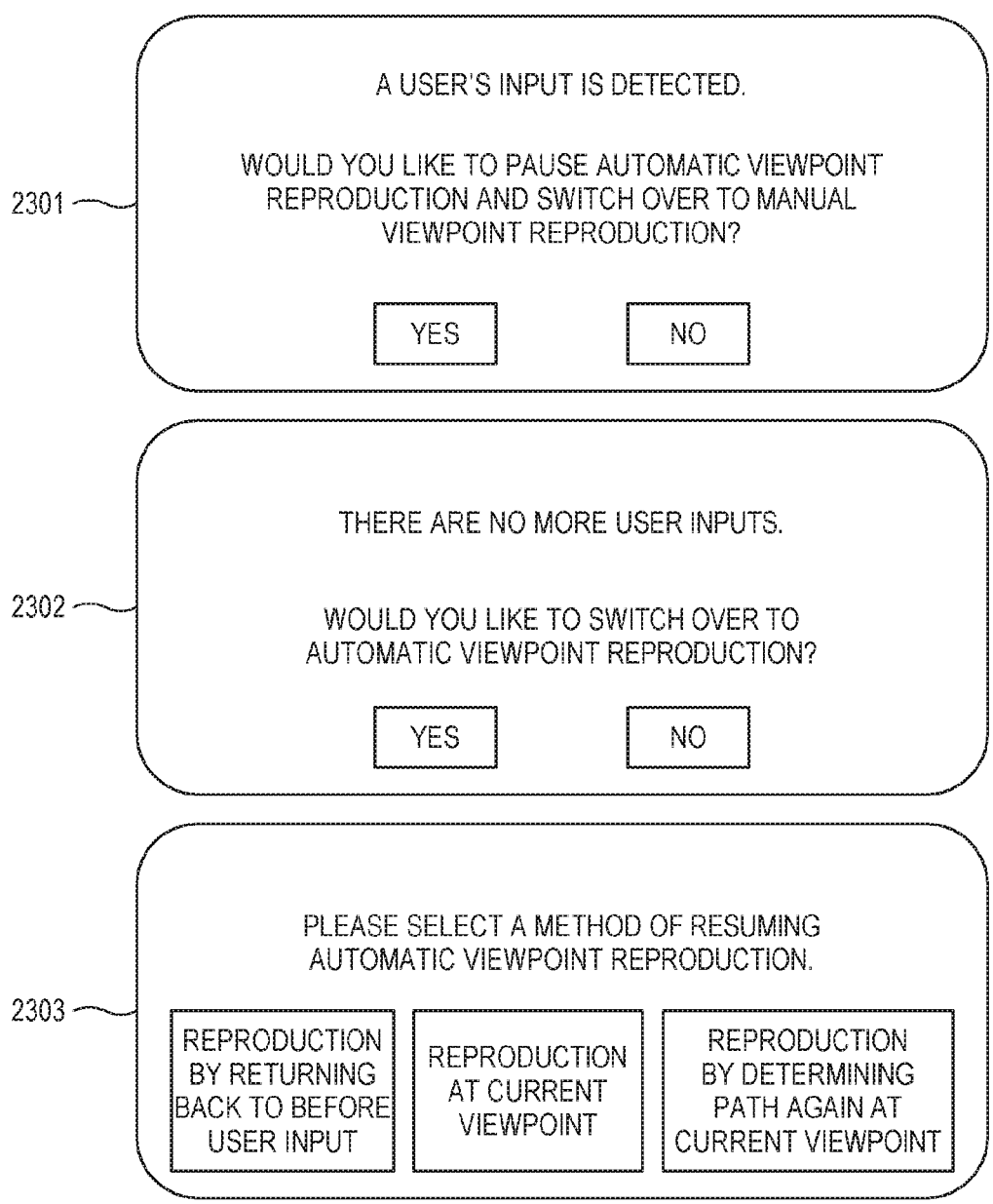
FIG. 23 illustrates user interfaces (UIs) displayed on the display apparatus according to an embodiment.

Meanwhile, referring back to FIG. 19, the controller 305 may resume the automatic viewpoint reproduction by selecting one of the operations S1904 to S1906 in response to a user's command. In this case, the controller 305 may control a user interface (UI) to be displayed for receiving a user's command. FIG. 23 shows an example of the UI according to an embodiment. For example, when a user's input is detected during the automatic viewpoint reproduction, the controller 305 may control the display 303 to display a UI 2301 showing the detection of the user's input. In this case, the controller 305 may pause the automatic viewpoint reproduction in response to a user's additional command issued through the UI 2301, and determine whether to switch over to the manual viewpoint reproduction. Alternatively, when a user's input is not made any more during the manual viewpoint reproduction, or when a user wants the automatic viewpoint reproduction again, the controller 305 may control the display 303 to display a UI 2302 showing this situation. Alternatively, the controller 305 may control the display 303 to display a UI 2303 for allowing a user to select one mode for resuming the automatic viewpoint reproduction among a plurality of modes for resuming the automatic viewpoint reproduction. In this case, the controller 305 resumes the automatic viewpoint reproduction in the mode selected in response to a user's additional command issued through the UI 2303.

Embodiments may be implemented through non-transitory computer-readable recording media having recorded thereon computer-executable instructions and data. The instructions may be stored in the form of program codes, and when executed by a processor, generate a predetermined program to perform an operation. Furthermore, when being executed by the processor, the instructions may perform operations according to the embodiments.

As described above, according to the disclosure, it is possible to minimize a burden needed for computing a moving path of the viewpoint during automatic viewpoint reproduction.

Further, according to the disclosure, it is possible to relieve dizziness a user may feel during the automatic viewpoint reproduction.

Further, according to the disclosure, it is more convenient for a user to resume the automatic viewpoint reproduction paused by intervention of the user.

Although embodiments have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
a display; and
a processor configured to
map a frame of a content on a three-dimensional object,
identify output coordinates corresponding to a viewpoint which changes according to a user's input while the content is played back, and
control the display to display a region of the frame mapped on the three-dimensional object based on the identified output coordinates,
wherein the processor is further configured to
identify first output coordinates of frames involved in a first section of the content,
playback the first section of the content based on the identified first output coordinates,
after the playback of the first section of the content is started, identify second output coordinates of frames involved in a second section of the content based on at least one of the first output coordinates, the second section following the first section,
playback the second section of the content based on the identified second output coordinates, and
control the viewpoint to be kept for a predetermined time period while the viewpoint move according to the identified second output coordinates.

2. The display apparatus according to claim 1, wherein the processor is further configured to identify the second output coordinates so that a movement of the viewpoint between the frames decreases.

3. The display apparatus according to claim 2, wherein the processor is further configured to replace the second output coordinates with fourth output coordinates, the fourth output coordinates being relatively closer to a straight path between the first output coordinates and third output coordinates than the second output coordinates, with regard to the first output coordinates, the second output coordinates and the third output coordinates determined in sequence.

4. The display apparatus according to claim 2, wherein the processor is further configured to control the viewpoint to move while decreasing at least one of a moving amount, a moving speed, and a moving acceleration of the viewpoint.

5. The display apparatus according to claim 2, wherein the processor is further configured to control the viewpoint to move from the first output coordinates to third output coordinates by skipping over the second output coordinates, with regard to the first output coordinates, the second output coordinates, and the third output coordinates determined in sequence.

6. The display apparatus according to claim 5, wherein the processor is further configured to interpolate fourth output coordinates into a point on an adjusted path from the first output coordinates to the third output coordinates, and control the viewpoint to move from the first output coordinates to the second output coordinates via the fourth output coordinates.

7. The display apparatus according to claim 2, wherein the processor is further configured to control the viewpoint to move in accordance with a change in the second output coordinates when the change in the second output coordinates is greater than or equal to a lower limit, and control the viewpoint to not move when the change in the second output coordinates is lower than the lower limit.

8. The display apparatus according to claim 1, further comprising a user input configured to receive the user's input,
wherein the processor is further configured to, when the user's input is received while the viewpoint is moving based on the first output coordinates determined by a predetermined method, control the viewpoint to move based on the first output coordinates determined by the received user's input.

9. The display apparatus according to claim 8, wherein the processor is further configured to determine the first output coordinates at a current viewpoint again by the predetermined method, and control movement of the viewpoint to be resumed, after moving the viewpoint based on the first output coordinates determined by the user's input.

10. The display apparatus according to claim 8, wherein the processor is further configured to control movement of the viewpoint to be resumed based on the first output coordinates previously determined by the predetermined method at a current viewpoint, after moving the viewpoint based on the first output coordinates determined by the user's input.

11. The display apparatus according to claim 8, wherein the processor is further configured to control movement of the viewpoint to be resumed based on the first output coordinates previously determined by the predetermined method by returning to the viewpoint at which the user's input is received, after moving the viewpoint based on the first output coordinates determined by the user's input.

12. A method of controlling a display apparatus, the method comprising:
mapping a frame of a content on a three-dimensional object;
identifying output coordinates corresponding to a viewpoint which changes according to a user input while the content is played back;

displaying a region of the frame mapped on the three-dimensional object based on the identified output coordinates;

identifying first output coordinates of frames involved in a first section of the content;

playing back the first section of the content based on the identified first output coordinates;

after the playback of the first section of the content is started, identifying second output coordinates of frames involved in a second section of the content based on at least one of the first output coordinates, the second section following the first section;

playing back the second section of the content based on the identified second output coordinates; and controlling the viewpoint to be kept for a predetermined time period while the viewpoint moves according to the identified second output coordinates.

13. The method according to claim 12, further comprising identifying the second output coordinates so that a movement of the viewpoint between the frames decreases.

14. The method according to claim 13, wherein the controlling of the viewpoint comprises replacing the second output coordinates with fourth output coordinates, the fourth output coordinates being relatively closer to a straight path between first output coordinates and third output coordinates than the second output coordinates, with regard to the first output coordinates, the second output coordinates and the third output coordinates determined in sequence.

15. The method according to claim 13, wherein the controlling of the viewpoint comprises controlling the viewpoint to move while decreasing at least one of a moving amount, a moving speed, and a moving acceleration of the viewpoint.

16. The method according to claim 13, wherein the controlling of the viewpoint comprises controlling the viewpoint to move from the first output coordinates to third output coordinates by skipping over the second output coordinates, with regard to the first output coordinates, the second output coordinates, and the third output coordinates determined in sequence.

17. The method according to claim 16, wherein the controlling of the viewpoint comprises interpolating fourth output coordinates into a point on an adjusted path from the first output coordinates to the third output coordinates, and controlling the viewpoint to move from the first output coordinates to the second output coordinates via the fourth output coordinates.

18. A non-transitory computer-readable recording medium having recorded thereon one or more instructions that are executable by a processor for performing operations for controlling a display apparatus, the operations comprising:

mapping a frame of a content on a three-dimensional object;

identifying output coordinates corresponding to a viewpoint which changes according to a user input while the content is played back;

displaying a region of the frame mapped on the three-dimensional object based on the identified output coordinates;

identifying first output coordinates of frames involved in a first section of the content;

playing back the first section of the content based on the identified first output coordinates;

after the playback of the first section of the content is started, identifying second output coordinates of frames involved in a second section of the content based on at least one of the first output coordinates, the second section following the first section;

playing back the second section of the content based on the identified second output coordinates; and controlling the viewpoint to be kept for a predetermined time period while the viewpoint moves according to the identified second output coordinates.

* * * * *